United States Patent [19]

Harris et al.

[11] Patent Number: 5,055,544

[45] Date of Patent: Oct. 8, 1991

[54] AMINO-FUNCTIONAL POLYESTERS CONTAINING UREA, BIURET, THIOUREA, DITHIOBIURET, THIOAMIDE, AND/OR AMIDE MOIETIES IN THEIR BACKBONE AND URETHANE/UREA PREPOLYMERS AND POLYMERS MADE THEREFROM

[75] Inventors: Robert F. Harris; Michael D. Joseph, both of Midland, Mich.

[73] Assignee: The Dow Chemical Company, Midland, Mich.

[21] Appl. No.: 485,678

[22] Filed: Feb. 27, 1990

Related U.S. Application Data

[63] Continuation-in-part of Ser. No. 247,460, Sep. 21, 1988, Pat. No. 4,916,201, which is a continuation-in-part of Ser. No. 99,027, Sep. 21, 1982, abandoned.

[51] Int. Cl.$^5$ .............................................. C08G 18/00
[52] U.S. Cl. ........................................ 528/59; 528/58; 528/76; 528/77; 528/78; 528/290; 528/292; 528/354; 528/359; 528/367; 564/17; 564/22; 564/26; 564/30; 564/32; 564/38; 564/47; 564/55
[58] Field of Search ...................... 528/59, 68, 76, 77, 528/78, 290, 292, 354, 359, 367; 564/17, 22, 26, 30, 32, 38, 47, 55

[56] References Cited

U.S. PATENT DOCUMENTS

| | | | |
|---|---|---|---|
| 3,248,424 | 4/1966 | Muller et al. | 260/553 |
| 3,471,449 | 10/1969 | Naydkamp et al. | 260/77.5 |
| 3,475,377 | 10/1969 | Rosendahl et al. | 260/75 |
| 3,583,937 | 6/1971 | Damusis | 260/31.4 |
| 3,591,560 | 7/1971 | Wagner et al. | 260/77.5 |
| 4,002,598 | 1/1977 | Waddill et al. | 260/47 EN |
| 4,115,360 | 9/1978 | Schulze et al. | 528/94 |
| 4,116,938 | 9/1978 | Schulze et al. | 528/93 |
| 4,141,885 | 2/1979 | Waddill | 260/75 |
| 4,146,701 | 3/1979 | Waddill et al. | 260/75 |
| 4,178,427 | 12/1979 | Waddill et al. | 528/124 |
| 4,340,712 | 7/1982 | Reichmann et al. | 528/45 |
| 4,356,275 | 10/1982 | Wagner et al. | 521/136 |
| 4,418,160 | 11/1983 | Rasshofer et al. | 521/159 |
| 4,525,590 | 6/1985 | Rasshofer et al. | 544/222 |

OTHER PUBLICATIONS

EPO Patent Application Ser. No. 240,196; 5/86.
EPO Patent Application Ser. No. 242,974; 10/87.

*Primary Examiner*—Maurice J. Welsh

[57] ABSTRACT

This invention relates to novel polymeric polyamines containing internal urea, biuret, thiourea, dithiobiuret, amide, and/or thioamide moieties, and to polymers prepared therefrom. This invention also relates to novel isocyanate-functional prepolymers containing urea, biuret, thiourea, dithiobiuret, amide, and/or thioamide moieties and to polymers prepared therefrom.

11 Claims, No Drawings

AMINO-FUNCTIONAL POLYESTERS CONTAINING UREA, BIURET, THIOUREA, DITHIOBIURET, THIOAMIDE, AND/OR AMIDE MOIETIES IN THEIR BACKBONE AND URETHANE/UREA PREPOLYMERS AND POLYMERS MADE THEREFROM

CROSS REFERENCE TO RELATED APPLICATIONS

This application is a continuation-in-part of Ser. No. 247,460 filed Sept. 21, 1988 now U.S. Pat. No. 4,916,201, which is a continuation-in-part of Ser. No. 099,027, filed Sept. 21, 1987 now abandoned, and is related to copending U.S. applications Ser. No. 926,692, filed Nov. 5, 1986 now abandoned; Ser. No. 000,227, filed Jan. 2, 1987 now U.S. Pat. No. 4,959,499; U.S. Pat. No. 4,689,353; U.S. application Ser. No. 254,503, filed Oct. 6, 1988, and Ser. No. 310,107, filed Feb. 10, 1989, by the same inventor.

BACKGROUND OF THE INVENTION

This invention relates to modified polyamines having backbones containing (1) polyether moieties and (2) urea, thiourea, amide, thioamide, dithiobiuret, and/or biuret moieties and to urethane/urea prepolymers and polymers thereof. These modified polyamines are useful as starting materials for the fabrication of urea/urethane polymers such as foams, elastomers, plastics, coatings and adhesives, and are also useful in the fabrication of epoxy resins.

In general it is known to prepare polyurethanes containing urea moieties by the reaction of a polyol and water with an isocyanate and a chain extender as disclosed in Sweeney, *Reaction Injection Molding Machinery and Processes* (1987). Many other types of polymers and oligomers containing urea moieties in their backbone are known materials which can be prepared in a variety of ways. The majority of such materials are prepared by the reaction of an isocyanate with an amine. The resulting products can range from simple monomers as disclosed in U.S. Pat. Nos. 3,294,749, 3,386,955, and 3,386,956, to oligomers as disclosed in U.S. Pat. Nos. 3,248,424 and 4,332,953, to soluble polymers as disclosed in U.S. Pat. No. 3,639,338, to dispersions in polyols as disclosed in German Patent 3,125,402. It is generally known that the introduction of urea moieties into a polyurea/urethane polymer improves the high temperature mechanical properties of the polymer.

Compounds or polymers containing trifunctional biuret moieties are generally produced by the reaction of a polyisocyanate with water. In such a reaction, a small number of isocyanate moieties are hydrolyzed to amino moieties by reaction with water. These amino moieties, in the presence of larger quantities of isocyanate moieties, react to form polyisocyanates containing urea moieties. Further reaction of the urea moieties with additional polyisocyanates produces polyisocyanates containing biuret moieties. These biuret-containing isocyanates have been known for many years and have been used in a variety of applications, for example as shown in U.S. Pat. Nos. 4,028,313; 4,203,875; 4,284,544; 4,289,813; 4,305,977; 4,388,245; and 4,449,591. It is generally recognized that the inclusion of trifunctional biuret moieties into a polyurea/urethane polymer produces a material having increased crosslink density.

Polyamides of polycarboxylic acids and poly(alkyleneoxy)polyamines are well-known compositions. Polyurethane coating compositions based on the reaction products of poly(propyleneoxy)polyamines with isocyanate-polyol prepolymers blocked with lactams are disclosed in Jpn 59/226062 (1984). Polyether polyols containing amide groups produced from partially aminated polyether polyols and adipoyl chloride or terephthaloyl chloride by reactions with isocyanates to produce urethane polymers are disclosed in DE 2,559,372 (1977).

It is also known to prepare isocyanate-functional prepolymers having urea moieties or biuret moieties or combinations thereof. Such isocyanate-functional prepolymers are prepared by first reacting a polyhydroxyl compound such as a polyether polyol with excess isocyanate. The resulting isocyanate-functional prepolymer is then chain-extended with reactions with polyamine or amino alcohols to produce polymers containing urethane and urea moieties in their backbones, such as shown in U.S. Pat. Nos. 3,471,449: 3,583,937: 3,627,714: 3,668,173 and 3,936,409. In some instances, the polymers contain only urea moieties in their backbones. In other cases, the polymers contain both urea and biuret moieties in their backbones. It is also known to react an isocyanate-functional prepolymer with a monofunctional amine to give polymers or oligomers which contain urea moieties near the end of the molecule as shown in U.S. Pat. No. 4,522,986.

In the polyurethanes and polyureas of the prior art containing urea and/or biuret moieties, the urea and/or biuret moieties are found to reside only in the hard segment of the resulting polyurethane or polyurea. Such polyureas/urethanes are observed to exhibit properties such as modulus, strength, hardness, toughness and solvent resistance which are less than are desired for many applications.

In view of such deficiencies of such prior art materials, it would be highly desirable to provide a polyurethane or polyurea having the desirable properties contributed by having urea, thiourea, dithiobiuret and/or biuret moieties without sacrificing significantly the properties of modulus, strength, hardness, toughness and solvent resistance.

SUMMARY OF THE INVENTION

In one aspect, this invention is a modified polyamine comprising a backbone portion containing at least one polyalkyleneoxy moiety and one or more internal biuret, thiourea, dithiobiuret, or thioamide moieties, and a plurality of primary amino groups wherein each amino group is separated from each biuret, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units.

In a second aspect, this invention is a modified polyamine with a molecular weight of at least 2000 comprising a backbone portion containing at least one polyalkyleneoxy moiety and two or more internal urea moieties, and a plurality of primary amino groups wherein each amino group is separated from each urea moiety by at least one alkylene, cycloalkylene, aralklene, arylene, or alkyleneoxy moiety with 4–20 carbon atoms, or at least one polyalkyleneoxy moiety containing from 2–50 alkyleneoxy units.

In a third aspect, this invention is a modified polyamine comprising a backbone portion containing at least one polyalkyleneoxy moiety and at least two amino-carbonyl moieties different from each other which two moieties are selected from the group consisting of urea, biuret, thiourea, dithiobiuret, thioamide and amide wherein each amino group is separated from each amino-carbonyl moiety by at least one alkylene, cycloalkylene, aralkylene, arylene, or alkyleneoxy moiety with 4–20 carbon atoms, or at least one polyalkyleneoxy moiety with 2–50 alkyleneoxy units.

In a fourth aspect, this invention is an isocyanate-functional prepolymer comprising the reaction product of one or more modified polyamines with a backbone portion containing at least one polyalkyleneoxy moiety and one or more moieties selected from the group consisting of urea, biuret, thiourea, dithiobiuret, thioamide, and amide with at least one organic polyisocyanate such that the reaction product has terminal isocyanate moieties.

In a fifth aspect, this invention is a polymer formed by the reaction of the aforementioned isocyanate-functional prepolymer with at least one active hydrogen-containing compound.

In a sixth aspect, this invention is a urethane/urea polymer formed by the reaction of one or more modified polyamines with a backbone portion containing at least one polyalkyleneoxy moiety and one or more moieties selected from the group consisting of urea, biuret, thiourea, dithiobiuret, thioamide, and amide with at least one organic polyisocyanate. In this sixth aspect, it is optional and often preferred to employ, in addition to the aforementioned modified polyamine, one or more other active hydrogen-containing compounds in the reaction to form the urethane/urea polymer.

In a seventh aspect, this invention is a post-cured urethane/urea polymer which has physical properties substantially better than those of the polymer prior to the post-cure.

The resulting urethane/urea polymers of this invention have superior properties such as higher modulus, greater strength, increased hardness and toughness and superior solvent resistance when compared to similar polymers which do not contain either urea, biuret, thiourea, dithiobiuret, thioamide, or amide moieties, and polyalkyleneoxy moieties. The increased modulus observed for the polymers of this invention prepared from aliphatic polyamines enable the manufacture of plastic parts having superior stiffness at lower hard segment contents which results in less cost than conventional polyurethane/urea polymers. The polymers of this invention also exhibit superior green strength on demold when fabricated in reaction injection molding equipment. This superior green strength allows the use of lower mold temperatures which results in economic and handling advantages. In many cases, the urethane/urea polymers of this invention cure faster than conventional urethane/urea polymers. This results in the economic advantage of reduced cure schedules.

In addition, the modified polyamines of the invention may be contacted with a cyclic lactone under reaction conditions sufficient to form an active hydrogen-containing compound with at least one hydroxyl end group. Preferably, this cyclic lactone is caprolactone or butyrolactone. These active hydrogen-containing compounds comprise a backbone portion containing at least one polyalkyleneoxy moiety and one or more internal urea, biuret, thiourea, dithiobiuret, or thioamide moieties, and a plurality of primary amino end groups and at least one hydroxyl end group, wherein each amino or hydroxyl end group is separated from each urea, biuret, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units. These active hydrogen-containing compounds which contain at least one hydroxyl end group may be contacted with isocyanates under reaction conditions sufficient to form prepolymers or polymers, optionally in the presence of additional active hydrogen-containing compounds.

DETAILED DESCRIPTION OF ILLUSTRATIVE EMBODIMENTS

When the modified polyamines of the present invention are diamines, they are generally represented by the formula:

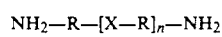

$$NH_2-R-[X-R]_n-NH_2 \qquad I$$

wherein each R is independently in each occurrence an alkylene, cycloalkylene, aralkylene, aryl, alkyleneoxy, or polyalkyleneoxy moiety, wherein at least one R is polyalkyleneoxy; X is independently in each occurrence an acyclic moiety selected from the group consisting of urea, biuret, thiourea, dithiobiuret, amide, and thioamide; when a urea moiety X is

when a biuret moiety X is

when a thiourea moiety X is

when a dithiobiuret moiety X is

when an amide moiety X is

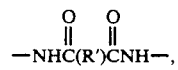

where R' is alkylene, cycloalkylene, aralkylene, arylene, and when a thioamide moiety X is

and n is an integer between 1 and 50, and preferably between 2 and 50. Corresponding structures can be used when the modified polyamines are triamines and higher polyamines.

The modified polyamines of the invention are prepared by contacting a polyalkyleneoxy polyamine with urea, thiourea, biuret, dithiobiuret, a polycarboxylic acid, or a polythiocarboxylic acid, or a combination thereof, optionally in the presence of a C4-20 alkylene-, cycloalkylene-, aralkylene-, or arylene polyamine.

The polyalkyleneoxy polyamines used in preparing the modified polyamines of the invention are well-known compositions which are conventionally prepared by the reductive amination of polyether polyols using hydrogen and ammonia in the presence of catalyst. This reductive amination of polyols is described in U.S. Pat. Nos. 3,128,311; 3,152,998; 3,236,895; 3,347,926; 3,654,370; 4,014,933 and 4,153,581, the relevant portions of which are hereby incorporated by reference.

Polyalkyleneoxy polyamines having 3-aminopropoxy end groups are also well-known compositions which can be used in preparing the modified polyamines of this invention. Such polyamines can be obtained by the cyanoethylation of polyamines with acrylonitrile followed by hydrogenation to the corresponding polyamines. The synthesis of materials of this type is described in Rylander, *Catalytic Hydrogenation in Organic Synthesis* (1979) and in U.S. Pat. Nos. 3,471,563; 3,880,928; 3,880,929; 3,896,174, the relevant portions of which are hereby incorporated by reference.

Optionally, other polyamines can be used in addition to the polyalkyleneoxy polyamines. These polyamines can be aliphatic, cycloaliphatic, aromatic, alkylene aromatic, araliphatic, or heterocyclic. Preferably, the amino moieties in such polyamines are sufficiently spaced apart to prevent the formation of cyclic urea moieties if the polyamine is reacted with urea. Preferably, the polyamine has a molecular weight of at least about 60, more preferably at least about 70, and most preferably at least about 80; and is preferably no greater than about 3000, more preferably no greater than about 2000, and most preferably no greater than about 1500.

Specific examples of suitable additional polyamines include butylenediamine, pentylenediamine, 2-methyl-1,5-pentanediamine, hexamethylenediamine, dodecamethylenediamine, trimethyldiaminohexane, 2,2'-bisaminopropylmethylamine, diethylenetriamine, triethylenetetraamine, and tetraethylenepentamine, dipropylenetriamine, piperazine, N,N'-bis-aminoethylpiperazine, triazine, 4-aminobenzylamine, 4-aminophenylethylamine, 1,4-diaminocyclohexane, phenylenediamines, naphthylenediamines, condensates of aniline and formaldehyde such as methylenediphenylamine, toluenediamine, bisaminomethyl benzenes and the derivatives of the above-mentioned aromatic amines including butylenediamine, hexamethylenediamine, dodecamethylenediamine, methylenediphenylamine, and toluenediamine. Especially preferred are butylenediamine, hexamethylenediamine, methylenediphenylamine and toluenediamine. If C4-12 aliphatic amines are used, they may contain minor quantities of C2-3 amines, but these are preferably absent as they may form cyclic urea moieties when reacted with urea.

The modified polyamines of this invention which contain internal biuret or thiobiuret moieties in their backbones can be prepared from the reaction of biuret or dithiobiuret with a polyamine. Biuret is an item of commerce having the formula:

$$\text{NH}_2\text{CNHCNH}_2 \quad \text{II}$$

Dithiobiuret is a well-known compound having the formula:

$$\text{NH}_2\text{CNHCNH}_2 \quad \text{III}$$

It can be made, for example, by the action of hydrogen sulfide on NH$_2$C(=NH)NHCN (as disclosed in U.S. Pat. No. 2,371,112 and French Patent 2,004,212).

In the preparation of the modified polyamines containing one or more biuret or dithiobiuret moieties in their backbones, one or more polyalkyleneoxy polyamines are contacted with biuret or dithiobiuret, optionally in the presence of C4-20 alkylene, cycloalkylene, aralkylene, or arylene polyamines, depending on which product is desired, under conditions sufficient to produce a corresponding biuret- or dithiobiuret-modified polyamine. Preferably, such reactions are carried out at temperatures in the range from about 100° C. to 200° C., more preferably from 110° C. to 175° C. and most preferably from 125° C. to about 160° C. The time of the reaction, while dependent upon the temperature used, is preferably in the range from 1 to 48 hours, most preferably from about 2 to 8 hours when the reaction temperature is about 150° C. and from about 5 to 24 hours when the reaction temperature is about 125° C.

Several types of modified polyamines useful in making the prepolymers and polymers of the invention which contain a limited amount of urea moieties but no thiourea, biuret, dithiobiuret, amide or thioamide moieties in their backbones are known compositions which can be prepared by a variety of techniques. For example, in one method, a polyether polyamine as described hereinbefore can be reacted with urea under the conditions described in U.S. Pat. Nos. 4,002,598; 4,115,360; 4,116,938; and 4,178,427. Alternatively, such polyamines containing a limited amount of urea moieties in their backbones are prepared by the reaction of the polyamine polyethers with diphenyl carbonate with the corresponding removal of phenol under conditions as described in U.S. Pat. Nos. 4,002,598; 4,115,360; and 4,178,427. The foregoing references also describe a third process for preparing such polyamines containing a limited amount of urea moieties by reacting a polyether polyamine with phosgene. Of the foregoing techniques, it is generally desirable to employ the reaction of the polyether polyamine with urea to provide the desired urea-containing polyamine. However, these urea polyamines of the prior art, which have an average of less than two internal urea moieties per molecule and low molecular weight, have been found to offer substantially less improvement in the physical properties of polyurethanes and polyureas prepared from them.

The modified polyamines of this invention which contain urea moieties but no biuret, dithiobiuret, thiourea, amide, or thioamide moieties in their backbones are characterized by having at least two internal urea moieties per molecule and a molecular weight of at least 2000. Preferably these modified polyamines contain three or more internal urea moieties per molecule. It is most preferred that these modified polyamines contain four or more internal urea moieties per molecule. The molecular weight of these modified polyamines is at least about 2000, more preferably at least about 3000; and is preferably no greater than about 100,000, more preferably no greater than about 50,000, and most preferably no greater than about 20,000.

Several types of modified polyamines useful in making the prepolymers and polymers of the invention which contain amide moieties but no urea, thiourea, biuret or dithiobiuret moieties in their backbones are known compositions which can be prepared by a variety of techniques. For example, in one method, an excess of a polyether polyamine as described hereinbefore can be reacted with polyacids under conditions whereby the acid moieties on the polyacid react with the amino moieties in the polyether polyamine to form amide linkages and the excess amino moieties in the polyether polyamine represent amino end groups. Examples of this process can be found in Jpn 51/125429, Jpn 51/75737, and U.S. Pat. No. 4,082,708. In another process for making polyether polyamines with amide moieties in their backbone, esters of polycarboxylic acids and/or anhydrides can be used in place of, or in addition to, the polycarboxylic acids used above. Examples can be found in DE 2,552,455; DE 2,552,518; DE 2,814,566: and U.S. Pat. Nos. 4,128,525 and 4,119,615. Epoxy resins can be included, such as in U.S. Pat. No. 4,133,803. Caprolactam can be included in the reactions of polyether polyamines with polyacids as taught in DE 3,006,961. Acid chlorides can be used in place of acids such as in DE 2,559,372. The relevant portions of references identified in this paragraph are incorporated by reference.

The modified polyamines of this invention which contain internal thioamide moieties in their backbone can be prepared from the reaction of an excess of a polyamine as described hereinbefore with polythioacids under conditions whereby the acid moieties of the polythioacid react with the amino moieties in the polyether polyamine to form thioamide linkages and the excess amino moieties in the polyether polyamine remain as amino end groups. Thioacid chlorides or thioesters can be used in place of thioacids to produce the internal thioamide moieties.

The modified polyamines of this invention which contain internal thiourea moieties in their backbones can be prepared from the reaction of thiourea with polyalkyleneoxy polyamines, optionally in the presence of $C_{4-20}$ alkylene, cycloalkylene, aralkylene, arylene, or alkyleneoxy polyamines. Thiourea is an item of commerce having the formula:

IV

In the preparation of these novel modified polyamines containing one or more thiourea moieties in their backbones, one or more of the above-named polyamines are contacted with thiourea under conditions sufficient to produce the desired product. Preferably, such reactions are carried out at temperatures in the range from about 100° C. to 200° C., more preferably from 125° C. to 200° C. and most preferably from 150° C. to 175° C. The time of the reaction, while dependent upon the temperature used, is preferably in the range from about 3 to 48 hours, most preferably from 12 to 24 hours when the reaction temperature is about 175° C.

Modified polyamines containing at least two different moieties selected from the group consisting of urea, biuret, thiourea, dithiobiuret, thioamide, and amide are also novel modified polyamines of this invention. Some of these modified polyamines can be prepared by the reaction of a polyether polyamine with a mixture of biuret and urea under the conditions described hereinabove. Alternatively, such modified polyamines containing both urea and biuret moieties can be prepared by first reacting a polyether polyamine with urea to form a modified polyamine containing urea moieties in its backbone and then reacting that product with biuret to form a modified polyamine containing both urea and biuret moieties in its backbone. Either the reaction with urea or biuret can be carried out first. This stepwise process is preferred since the optimum conditions for each reaction are slightly different.

A modified polyamine containing thiourea moieties and one or more of the following moieties: urea, biuret, dithiobiuret, amide, or thioamide, can be prepared by first reacting a polyether polyamine with thiourea to form a modified polyamine containing thiourea moieties in its backbone and then reacting that product with one or more of the following: urea, biuret, dithiobiuret, a polycarboxylic acid, or a polythiocarboxylic acid, depending on which combination of moieties is desired. Conversely, modified polyamines containing one or more of the following moieties: urea, biuret, dithiobiuret, amide, or thioamide, can be reacted with thiourea to form products containing thiourea moieties and one or more of the following moieties: urea, biuret, dithiobiuret, amide, or thioamide. Alternatively, such modified polyamines can be prepared by reacting a polyether polyamine with a mixture of thiourea and one or more of the following: urea, biuret, polycarboxylic acid, dithiobiuret, or polythiocarboxylic acid.

A modified polyamine containing amide moieties can be first prepared from a polyether polyamine and a polycarboxylic acid (or by other processes described hereinbefore) followed by reaction with one or more of the following: urea, biuret, thiourea, dithiobiuret, or polythiocarboxylic acid, to produce a product containing both amide moieties and one or more of the following moieties: urea, biuret, thiourea, dithiobiuret, or thioamide, in its backbone, depending on which product is desired. Conversely, modified polyamines containing one or more of the following moieties: urea, biuret, thiourea, dithiobiuret, or thioamide, can be reacted with polyacids to form the corresponding product containing amide moieties in its backbone.

A modified polyamine containing dithiobiuret moieties and one or more of the following moieties: urea, thiourea, biuret, amide, or thioamide, can be prepared by reacting a polyether polyamine with dithiobiuret and one or more of the following: urea, thiourea, biuret, polycarboxylic acid, or polythiocarboxylic acid, depending on which product is desired. Either the reaction with the dithiobiuret or one or more of the aminocarbonyls or aminothiocarbonyls can be carried out first. This stepwise process is preferred since the optimum conditions for each reaction are slightly different.

A modified polyamine containing thioamide moieties and one or more of the following moieties: urea, thiourea, biuret, dithiobiuret, or amide, can be prepared by reacting a polyether polyamine with polythiocarboxylic acid and one or more of the following: urea, thiourea, biuret, dithiobiuret, or polycarboxylic acid, depending which product is desired. Either the reaction with the polythiocarboxylic acid or one or more of the aminocarbonyls or aminothiocarbonyls may be carried out first. This step wise process is preferred since the optimum conditions for each reaction are slightly different.

The stoichiometry of the reactants used to prepare the modified polyamines containing urea, thiourea, biuret and/or dithiobiuret moieties can vary depending upon the number of internal urea, thiourea, biuret and/or dithiobiuret moieties desired in the average backbone molecule. For example, in the case of the reaction of a diamine with a biuret, a molar ratio of two diamines per one biuret will give a product which contains about one biuret moiety per average polyamine molecule. In contrast, a diamine biuret mole ratio of 1.3:1 will give a modified polyamine product which contains about four biuret moieties per average molecule. In the case of urea-containing polyamines, a molar ratio of two diamine units to one urea unit will give a modified polyamine product which contains about 1 urea moiety per average product molecule. A diamine:urea ratio of 1.3:1 will give a product which contains about 4 urea moieties per average polyamine molecule.

Although it is possible to prepare modified polyamines containing urea, thiourea, biuret and/or dithiobiuret moieties in their backbones in solvents, it is generally preferred to prepare them in a neat condition. However, when solvents are used, they are generally inert organic solvents which are more volatile than the resulting product. Examples of such solvents include alcohols, ethers, amides, sulfoxides, and certain hydrocarbons such as aniosole, phenyl ethyl ether, cumene, hexanol, dodecanol, dimethyl acetamide and dimethyl sulfoxide. Following the reaction, the solvents can be vaporized. Reduced pressures can be used to increase reaction rate by facilitated ammonia removal. This technique can be applied toward the final stages of reaction to increase conversion.

For the preparation of any of the aforementioned modified polyamines, it is generally unnecessary to purify the product to any significant degree. Usually small amounts of unreacted biuret can be removed by filtration if necessary. If a solvent is employed it can be removed by fractional distillation. Residual ammonia can be removed by heating under reduced pressure. When an amide or thioamide is made by the reaction of a polyether polyamine with a polycarboxylic acid or polythiocarboxylic acid, water is the by-product of the reaction. It is preferred to include a small amount of solvent in the reaction mixture which can remove the water by azeotropic distillation. Toluene, xylene and cumene are convenient solvents They can be removed by fractional distillation after the reaction is complete. Alternatively, the reaction can be run neat under reduced pressure whereby the water is volatilized from the reaction mixture as it is formed.

In the aforementioned modified polyamines, the end group functionality of the product is controlled by the functionality of the polyether polyamine employed. If a difunctional modified polyamine is desired, a polyether diamine is used to synthesize the product. If higher functionality is desired, then a blend of a polyether diamine and a polyether polyamine with a functionality of three or higher can be used. For even higher functionality, only polyethylene polyamines with functionalities of three or higher can be employed. When amide and/or thioamide moieties are employed, functionality of the polyacid and/or polythioacid also controls the functionally of the product.

The particular polyether polyamine selected to prepare the modified polyamine-containing urea, biuret, thiourea, dithiobiuret, thioamide, amide, or mixture thereof is dependent upon the required properties of the final product. For example, a polyethyleneoxy polyamine will be used to add hydrophilic characteristics to the product whereas polymers of higher alkyleneoxy polyamines such as polypropyleneoxy, polybutyleneoxy and the like, will be employed to add hydrophobic character to the resultant product. It is understood that even greater hydrophobic characteristics can be imparted by the use of higher alkyl-containing materials such as epoxides of 1-octene, 1-decene, 1-dodecene, 1-hexadecene, and 1-octadecene. Also suitable as starting materials for preparing polyether polyamines are glycidyl ethers of alcohols such as hexanol, octanol, decanol, dodecanol, tetradecanol, hexadecanol and octadecanol.

The properties of the resulting urethane polymers can be significantly modified by the selection of the polyether moieties of the polyamines. For example, polyethyleneoxy moieties are useful when the polyurethanes require antistatic properties. Polypropyleneoxy and higher alkyleneoxy polymers are useful in polymers requiring resistance to hydrolysis. Combinations of ethylenexoy and higher alkyleneoxy polymers are desirable in instances wherein a balance of properties are required.

The modified polyamines of the invention range from viscous liquids to low melting solids depending upon the molecular weight of the polyamine and the composition of the polyether polyamines used in their preparation. Preferably, the number average molecular weight of such modified polyamines containing one or more of the following moieties: urea, biuret, thiourea, dithiobiuret, thioamide, or amide, is within the range from about 400 to 100,000 or more, most preferably from about 600 to about 40,000. Preferably, the number average molecular weight of such modified polyamines containing two or more urea moieties is within the range from about 2,000 to 10,000, most preferably from about 3,000 to about 20,000.

The amino-functional products containing one or more of the following internal moieties: urea, biuret, thiourea, dithiobiuret, thioamide, or amide, have a controllable spacing between these moieties. The molecular weight and molecular weight distribution of the polyether polyamine starting material will carry over into the modified polyamine product and thereby determine the spacing of the urea, biuret, thiourea, and dithiobiuret moieties. The spacing between amide or thioamide moieties depends on the length of the polyacids from which they are prepared. For example, if a polyether diamine of 400 molecular weight is used as the reactant, then the modified polyamine product will have approximately a 400 molecular weight polyether spacing between each internal urea and/or biuret moiety. If a polyether diamine of approximately 400 molecular weight is used as reactant with adipic acid, then the modified polyamine product will have approximately a 400 molecular weight spacing and a 56 molecular weight spacing alternating between successive amide groups.

The amino end groups of the polyamines containing at least on acyclic moiety selected from the group consisting of urea, thiourea, biuret, dithiobiuret, amide, and thioamide can be converted to the corresponding hydroxyl functional material by reaction with cyclic lactones. As the molar ratio of cyclic lactone:polyamine is increased, a series of products can be produced. At lower molar ratios, active hydrogen-containing compounds which contain both amino and hydroxyl end groups can be produced. A second class of products which may be produced at higher molar ratios contains only hydroxyl end groups. A third class of products may be produced at even higher molar ratios in which hydroxyl end groups react further with cyclic lactones to form ester linkages and a higher molecular weight hydroxyl functional product.

Preferred cyclic lactones are caprolactone and butyrolactone, The most preferred reaction temperature is about 180° C. for caprolactone and about 125° C. for butyrolactone. The conversion of primary amino end groups to hydroxyl end groups is a way of controlling end group activity. The lower reactivity of hydroxyl end groups toward polyisocyanates allows for the use of these materials in applications such as cast elastomers and flexible foams, where lower reaction rates are required.

The isocyanate-functional prepolymer compositions of this invention are formed by the reaction of the modified polyamine containing one or more of the following moieties: biuret, urea, thiourea, dithiobiuret, thioamide, or amide, with excess polyisocyanate.

The polyisocyanates suitable for making the novel compositions of this invention include aliphatic, cycloaliphatic, araliphatic, aromatic and heterocyclic polyisocyanates. Specific examples include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789; 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385.

In addition, derivatives of 4,4'-diphenylmethane diisocyanate which are liquid at room temperature such as, for example, polyisocyanates which have carbodiimide groups in their backbone or mixtures thereof may also be used. The preparation of these materials is disclosed in U.S. Pat. No. 3,152,162, which is hereby incorporated by reference in its entirety. An example of a commercial material of this type is Isonate TM 143L Isocyanate, a product of The Dow Chemical Company.

It is also possible to use the distillation residues containing isocyanate groups accumulating in the commercial production of isocyanates, optionally in solution in one or more of the aforementioned polyisocyanates. In addition, it is possible to use mixtures of the aforementioned polyisocyanates Additional polyisocyanates suitable for use in this invention include those described by W. Siefken in *Justus Liebigs Annalen der Chemie*, 562, pp. 75–136, and in U.S. Pat. Nos. 3,284,479; 4,089,835; 4,093,569; 4,221,876; 4,310,448; 4,359,550 and 4,495,309.

One class of particularly useful polyisocyanates are the aromatic polyisocyanates such as 2,4- and 2,6-tolylene diisocyanates and mixtures of these isomers ("TDI"), polyphenyl-polymethylene polyisocyanates of the type obtained by condensing aniline with formaldehyde, followed by phosgenation ("crude MDI") and, polyisocyanates containing carbodiimide groups, urethane groups, allophanate groups, isocyanurate groups, urea groups or biuret groups ("modified polyisocyanates")

A preferred class of aromatic polyisocyanates is methylene bis(4-phenylisocyanate) or MDI. Pure MDI, quasi- and prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine-modified pure MDI is included also. This product is made by heating pure distilled MDI in the presence of a catalyst.

In the preparation of such prepolymers, excess isocyanate can be added to the modified polyamine or the modified polyamine can be added to excess isocyanate. Preferably, the modified polyamine is added to excess isocyanate under conditions which are well-known for the reaction of polyisocyanates with prior art active hydrogen-containing compounds. Examples of such conditions are described in U.S. Pat. Nos. 4,108,842; 4,125,522 and 4,476,292, the relevant portions of which are hereby incorporated by reference.

The viscosity of the modified polyamine increases with increasing number of urea, thiourea, biuret, dithiobiuret, thioamide and/or amide moieties in the polyamine backbone and with increasing molecular weight of the polyamine. This increased viscosity in the modified polyamine results in increased viscosity in the corresponding isocyanate functional prepolymer. This requires corresponding increases in the reaction temperature during prepolymer formation. Temperatures of 80°

C. to 110° C. or even higher are required as the modified polyamine and/or prepolymer viscosity increases. At the higher temperatures, prepolymer stability is sometimes reduced and chain extension of the prepolymer to the corresponding polymer needs to be carried out more quickly. The presence of mildly acidic prepolymer stabilizers, such as benzoyl chloride, can be useful. In some cases an inert solvent, such as dimethylsulfoxide, dimethylformamide or dimethylacetamide, is used to reduce the viscosity of the modified polyamine and the corresponding prepolymer. A chain extender can be added to the prepolymer solution and the resultant polymer separated. When the polymer is soluble it can be cast as a film from solution or it can be precipitated by the addition of a poor solvent or it can be obtained by removal of the solvent.

It is further understood that such prepolymers of this invention may also be prepared by the reaction of the modified polyamine and an active hydrogen-containing compound as a mixture with excess polyisocyanate. This is another way to reduce the viscosity of the prepolymer and thereby facilitate its handling. In such prepolymers, the modified polyamine:active hydrogen-containing compound mole ratio is in the range from about 20:1 to about 0.05:1, most preferably from about 10:1 to about 0.1:1. These mixed amine active hydrogen-containing compound prepolymers are also isocyanate-functional and are prepared using conditions known in the prior art as cited hereinbefore.

In a fifth aspect, this invention is a novel urethane and/or urea polymer formed by the reactions of the aforementioned isocyanate-functional prepolymer of this invention with an active hydrogen-containing compound or mixtures of active hydrogen-containing compounds. An active hydrogen-containing compound is a compound having a plurality of active hydrogen moieties that are reactive with the Zerewitinoff reagent according to a test described by Kohler in 49 *Jour. of the Amer. Chem. Soc.* 3181 (1927). Examples of such moieties include mercaptan, hydroxyl, primary and secondary amine, and acid groups. Such compounds are also referred to as "polyahls". Many such active hydrogen-containing compounds of a lower molecular weight are commonly called chain-extenders when used with isocyanate-functional prepolymers and are optionally employed with catalysts and a variety of other additives. High molecular weight active hydrogen-containing compounds can also be used.

The chain-extenders useful to make the compositions of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Other chain-extenders including cyclic diols such as 1,4-cyclohexanediol and 1,4-cyclohexanedimethanol; aromatic ring-containing diols such as bishydroxyethylhydroquinone; amide- or ester-containing diols or amino alcohols are useful. Aromatic diamines and aliphatic diamines are suitable chain-extenders. Examples include ethylenediamines, 1-(2-aminoisopropyl-4-methyl-4-aminocyclohexane), 1,2-propanediamine, 1,4-butanediamine: 1,6-hexanediamine, diethyltoluenediamine and 1,4-bis-(aminomethyl)cyclohexane. Additional examples of useful chain-extenders can be found in U.S. Pat. Nos. 4,297,444; 4,202,957; 4,476,292; 4,495,309 and 4,218,543.

Catalysts such as tertiary amines or an organic tin compound or other polyurethane catalysts may be used. The organic tin compound may suitably be a stannous or stannic compound, such as stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 18 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used. Other catalysts include organo zinc, mercury and lead compounds. For some polymers, a catalyst is not needed.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethyl ether, etc.), 1,4-dimethylpiperazine, triethylenediamine, etc., and aliphatic polyamines, such as N,N,N',N'-tetramethyl-1,3-butanediamine.

Optional additives include anti-foaming agents such as glycerine, an ethyl acrylate-2-ethylhexyl acrylate copolymer, dimethyl siloxane copolymers and silicones; antioxidants such as esters of β-(3,5-di-tert-butyl-4-hydroxyphenyl) propionic acid with monohydric or polyhydric alcohols, for example, methanol, octadecanol, 1,6-hexanediol, neopentyl glycol, thiodiethylene glycol, diethylene glycol, triethylene glycol, pentaerythritol, tris-hydroxyethyl isocyanurate, and dihydroxyethyl oxalic acid diamine; UV absorbers and light stabilizers such as 2-(2'-hydroxyphenyl)benzotriazoles and sterically hindered amines such as bis-(2,2,6,6-tetramethylpiperidyl-sebacate, bis-(1,2,2,6,6-pentamethylpiperidyl)-sebacate, n-butyl-3,5-di-tert-butyl-4-hydroxybenzyl malonic acid, bis-(2,2,6,6-pentamethylpiperidyl)ester, condensation product of 1-hydroxyethyl-2,2,6,6-tetramethyl-4-hydroxypiperidine and succinic acid, condensation product of N,N'-(2,2,6,6-tetramethylpiperidyl)-hexamethylene diamine and 4-tert-octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butane-tetracarbonic acid and 1,1'-(1,2-ethanediyl)-bis-(3,3,5,5-tetramethylpiperazinone); plasticizers such as phthalates, adipates, glutarates, epoxidized vegetable oils, and the like: fungicides; pigments; dyes; reactive dyes; moisture scavengers; and the like. In addition, fillers and reinforcing materials such as chopped or milled glass fibers, chopped or milled carbon fibers and/or other mineral fibers are useful.

Approximately stoichiometric amounts of the isocyanate moieties of the isocyanate-functional prepolymers of this invention and the active hydrogen moieties on the active hydrogen-containing compounds are used. The equivalent ratio of isocyanate moieties to total active hydrogen moieties is between about 0.95:1.00 to 1.00:1.05, more preferred is an isocyanate:active hydrogen-containing compound equivalent ratio of from 0.97:1.00 to 1.00:1.03, most preferred is a ratio of 1.00:1.00 to 1.00:1.03.

In a sixth aspect, this invention is a novel urethane/urea polymer formed by the reaction of the modified polyamine with a polyisocyanate as defined hereinbefore. Such urethane/urea polymers are optionally prepared in the presence of other active hydrogen-containing compounds as defined hereinbefore and catalysts and other additives used conventionally to prepare urethane and urea polymers. For some polymers a catalyst is not needed.

Approximately stoichiometric amounts of the isocyanate moieties of the polyisocyanates and the total active hydrogen moieties on the modified polyamine and other active hydrogen-containing compounds, if employed, are used. The equivalent ratio of isocyanate moieties to total active hydrogen moieties is between about 0.90:1.00 to 1.00:1.25: more preferred is an isocyanate-:active hydrogen equivalent ratio of from 0.95:1.00 to 1.00:1.15, most preferred is a ratio of 0.98:1.00 to 1.00:1.05. The preparation of urethane/urea polymers is well-known in the art. Examples of typical reaction conditions employed can be found in U.S. Pat. Nos. 4,460,715 and 4,394,491, the relevant portions of which are hereby incorporated by reference.

The urethane/urea and/or biuret and/or thiourea and/or dithiobiuret and/or thioamide and/or amide polymers of the present invention can be fabricated by any fabrication technique known in the art. Useful processes include hand casting (see, for example, U.S. Pat. No. 4,476,292) and reaction injection molding (see, for example, U.S. Pat. Nos. 4,297,444 and 4,495,309).

Reaction injection molding (RIM) is a preferred fabrication technique. The relatively high viscosities of the modified polyamines are readily reduced by heating. This is easily accomplished in RIM equipment by heating the tank and lines. Viscosity is also reduced by blending with chain-extending agents and, optionally, with other active hydrogen-containing compounds. The urethane/urea polymers of this invention are useful in automotive body panel applications or automotive facsia.

In the seventh aspect, this invention is a urethane/urea polymer which has been post-cured by heating the urethane/urea polymer that forms the sixth or seventh aspect of this invention to a temperature in the range from about 175° C. to about 200° C. for a period from about 1 to about 12 hours or more. To prevent degradation, it is preferred to carry out the post-curing process in an inert atmosphere, such as nitrogen, when using higher temperatures or longer heating periods. As a result of this post-cure, the properties such as modulus and tensile strength of the resultant polymer are noticeably improved.

Illustrative Embodiments

The following examples are given to illustrate the invention and should not be interpreted as limiting it in any way. Unless stated otherwise, all parts and percentages are given by weight.

Example 1

1A(1). Preparation of a Diamine Containing About Four Urea Moieties per Average Backbone Molecule; Molecular Weight=9,866.

A diamine containing about 4 urea moieties per average backbone molecule is prepared by reacting Jeffamine TM D-2000 (2332.2 g, 1.10 moles; an aminated poly(propylene glycol) of 2036 number average molecular weight, a product of the Jefferson Chemical Division of Texaco) with urea (154.8 g, 0.91 mole; D-2000 : urea molar ratio=1.20) in a 3-liter, 3-necked flask equipped with a thermometer, overhead stirrer, condenser, temperature control system and maintained under a nitrogen atmosphere. The contents of the flask are heated at 150° C. for 16 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.202 meq/g; molecular weight by end group titration, 866; Brookfield viscosity, 13,820 cps; Tg, −64° C. Carbon-13 NMR indicated the presence of internal urea moieties (157.8 ppm) and amino end groups.

1A(2). Preparation of a Diamine Containing About Nine Urea Moieties per Average Backbone Molecule; Molecular Weight=20,700.

A diamine containing about 9 urea moieties per average backbone molecule is prepared by reacting Jeffamine TM D-2000 (396.98 g, 0.1944 mole) with urea (11.12 g, 0.185 mole: D-2000:urea molar ratio=1.05) in the same reactor setup used in Example 1A(1), except using a 500-ml reactor. The contents of the flask are heated at 175° C. for 23 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.0966 meq/g; molecular weight by end group titration, 20,700; Brookfield viscosity, 141,200 cps.

1A(3). Preparation of a Diamine Containing About Twenty Urea Moieties per Average Backbone Molecule: Molecular Weight=42,800.

A diamine containing about 20 urea moieties per average backbone molecule is prepared by reacting Jeffamine TM D-2000 (364.37 g, 0.1784 mole) with urea (10.51 g, 0.1749 mole; D-2000:urea molar ratio=1.02) in the same reactor setup used in Example 1A(2). The contents of the flask are heated at 175° C. for 23 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.0467 meq/g; molecular weight by end group titration, 42,800; Brookfield viscosity, 627,000 cps.

1A(4). Preparation of a Diamine Containing About Three Urea Moieties per Average Backbone Molecule: Molecular Weight=8023.

A diamine containing about 3 urea moieties per average backbone molecule is prepared by reacting an aminated poly(butylene glycol) of 2070 number average molecular weight (348.08 g, 0.168 mole) with urea (8.41 g, 0.140 mole; aminated B-2000:urea molar ratio=1.20) in the same reaction setup used in Example 1A(2). The contents of the flask are heated at 150° C. for 24 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.244 meq/g; molecular weight by end group titration, 8203; Brookfield viscosity, 11,500 cps. This example shows that polyamines containing polyoxybutylene moieties in their backbones can be used to make the compositions of this invention.

1A(5). Preparation of a Diamine Containing About Seven Urea Moieties per Average Backbone Molecular; Molecular Weight=15,307.

A diamine containing about 7 urea moieties per average backbone molecule is prepared by reacting an aminated poly(butylene glycol) of 2070 number average molecular weight (350.23 g, 0.169 mole) with urea (9.96 g, 0.166 mole; aminated B-2000:urea molar ratio = 1.02) in the same reaction setup used in Example 1A(2). The contents of the flask are heated at 175° C. for 50 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.1307 meq/g; molecular weight by end group titration, 15,307; Brookfield viscosity, 63,600 cps. This example shows that polyamines containing polyoxybutylene moieties in their backbones can be used to make the compositions of this invention.

1A(6). Preparation of a Diamine Containing About Three Urea Moieties per Average Backbone Molecule Based on D-400/D-2000 Blends; Molecular Weight = 3367.

A diamine containing about 3 urea moieties per average backbone molecule is prepared by reacting a blend of Jeffamine ™ D-400 (1592.5 g, 3.488 moles) and Jeffamine ™ D-2000 (1736.5 g, 0.872 mole) with urea (209.5 g, 3.488 moles) in the same reactor setup used in Example 1A(1), except using a 5-liter reactor. The contents of the flask are heated at 175° C. for 20 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.594 meq/g; molecular weight by end group titration, 3367; 3.35 urea moieties/average molecule by perchloric acid titration; Brookfield viscosity, 19,000 cps at 25° C.

1A(7). Preparation of a Diamine Containing About Three Urea Moieties per Average Backbone Molecule Based on D-400/D-2000 Blends; Molecular Weight = 4710.

A diamine containing about 3 urea moieties per average backbone molecule is prepared by reacting a blend of Jeffamine ™ D-400 (815.4 g, 1.786 mole) and Jeffamine ™ D-2000 (2374.7 g, 1.191 moles) with urea (143.0 g, 2.381 moles) in the same reactor setup used in Example 1A(6). The contents of the flask are heated at 175° C. for 24 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.425 meq/g; molecular weight by end group titration, 4710; 3.36 urea moieties/average molecule by perchloric acid titration; Brookfield viscosity, 11,760 cps at 25° C.

1A(8). Preparation of a Diamine Containing About Four Urea Moieties per Average Backbone Molecule Based on D-400/D-2000 Blends; Molecular Weight = 6326.

A diamine containing about 4 urea moieties per average backbone molecule is prepared by reacting a blend of Jeffamine ™ D-400 (433.7 g, 0.950 mole) and Jeffamine ™ D-2000 (2841.7 g, 1.425 moles) with urea (114.1 g, 1.900 moles) in the same reactor setup used in Example 1A(6). The contents of the flask are heated at 175° C. for 24 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.316 meq/g; molecular weight by end group titration, 6326; 3.75 urea moieties/average molecule by perchloric acid titration; Brookfield viscosity, 15,200 cps at 24° C.

1A(9). Preparation of a Diamine Containing About Four Urea Moieties per Average Backbone Molecule Based on D-2000; Molecular Weight = 11,119.

A diamine containing about 4 urea moieties per average backbone molecule is prepared by reacting Jeffamine ™ D-2000 (3375.8 g, 1.653 moles) with urea (82.7 g, 1.378 moles) in the same reactor setup used in Example 1A(6). The contents of the flask are heated at 150° C. for 39 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.180 meq/g; molecular weight by end group titration, 11,119; 4.40 urea moieties/average molecule by perchloric acid titration; Brookfield viscosity, 24,050 cps at 23° C.

1A(10). Preparation of a Diamine Containing About Six Urea Moieties per Average Backbone Molecule Based on D-400; Molecular Weight = 3443.

A diamine containing about 6 urea moieties per average backbone molecule is prepared by reacting Jeffamine ™ D-400 (3080.8 g, 6.839 moles) with urea (357.2 g, 5.947 moles) in the same reactor setup used in Example 1A(6). The contents of the flask are heated at 150° C. for 23 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.581 meq/g; molecular weight by end group titration, 3443; 6.36 urea moieties/average molecule by perchloric acid titration; Brookfield viscosity, 341,000 cps at 25° C.

1A(11). Preparation of a Diamine Containing About Sixteen Urea Moieties per Average Backbone Molecule Based on D-2000; Molecular Weight = 33,471.

A diamine containing about 16 urea moieties per average backbone molecule is prepared by reacting Jeffamine ™ D-2000 (3206.1 g, 1.570 moles) with urea (92.5 g, 1.539 moles) in the same reactor setup used in Example 1A(6). The contents of the flask are heated at 150° C. for 94 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.0598 meq/g; molecular weight by end group titration, 33,471; 15.65 urea moieties/average molecule by perchloric acid titration; Brookfield viscosity, 228,800 cps at 25° C.

1A(12). Preparation of a Diamine Containing Four Urea Moieties per Average Backbone Molecule; Molecular Weight = 1912.

Jeffamine ™ D-400 (3775.7 g, 8.64 moles) and urea (432.0 g, 7.20 moles), at a D-400:urea molar ratio = 1.20 are combined in the same reactor setup used in Example 1A(6). The contents of the flask are heated at 135° C. for 24 hours during which time ammonia is evolved and passed into an aqueous scrubber. The resultant viscous liquid is treated on a rotary evaporator at 90° C under a 20 mm Hg vacuum to remove all of the ammonia by-product. The product is a clear, light yellow, viscous liquid having an amine content of 1.046 meq/g which corresponds to a molecular weight of 1912 by end group analysis; Brookfield viscosity, 41,100 cps. $^{13}$C nuclear magnetic resonance analysis shows internal urea carbonyl moieties (158.0 ppm), the methylene carbon attached to urea (—CH(CH$_3$)NHC(0)NH—, 45.7 ppm) and the methylene carbon attached to the amino end groups (—CH(CH$_3$)NH$_2$, 46.8 ppm).

1A(13). Preparation of an Isocyanate-Functional Prepolymer Based on a Urea Backbone Diamine and MDI.

The diamine containing about 4 urea moieties per average molecule of Example 1A(12) (76.20 g) is placed in a 100-ml resin pot equipped with thermometer, overhead stirrer, temperature controlled at 80° C. by an oil bath and maintained under a nitrogen atmosphere. One drop (about 15 mg) of benzoyl chloride is added as a prepolymer stabilizer. The contents of the reactor are equilibrated at 80° C. and the benzoyl chloride dissolved by thorough agitation. Freshly distilled 4,4'-methylenedi(phenyl-isocyanate) (MDI, 44.70 g, Isonate TM 125 M, manufactured by The Dow Chemical Company), is added by syringe to the reactor under nitrogen cover. The contents of the reactor are stirred at 80° C. for one hour.

The prepolymer is then analyzed for isocyanate content (ASTM D-1638-74). A sample (1.818 g) is dissolved in dry dimethyl formamide (25 ml) and treated with an excess of a standard di-n-butylamine solution in dry toluene (0.2 N, 50 ml) for 15 minutes at ambient temperature with stirring. Additional dry dimethyl formamide (25 ml) is added and the excess amine is titrated using 0.1 N HCl. The weight percent isocyanate is found to be 10.15.

1A(14). Preparation of a Urethane/Urea Polymer From an Isocyanate-Functional Prepolymer.

The isocyanate-functional prepolymer of Example 1A(13) (105.92 g) is thoroughly degassed under vacuum and quickly poured into a 150-ml plastic cup. Two drops (about 30 mg) of a catalyst solution are added (10.0 weight percent dibutyltin dilaurate in poly(propylene glycol) of 2000 molecular weight) 1,4-Butanediol (11.3 g, distilled from CaH$_2$) which had been thoroughly degassed under vacuum is added quickly to give a 1.05 index (molar ratio of isocyanate:hydroxyl=1.05). The mixture is stirred rapidly for 32 seconds and then poured into a preheated mold (6.0"×6.0"×0.125"). The sample is then cured at 121° C. (250° F.) for one hour. A urethane/urea plastic plaque is obtained upon demolding.

1A(15). Preparation of an Isocyanate-Functional Prepolymer Based on a Urea Backbone Diamine and TDI.

The diamine containing about 4 urea moieties per average molecule of Example 1A(12) (78.20 g) is placed in the same reaction setup used in Example 1A(13). One drop (about 15 mg) of benzoyl chloride is added as a prepolymer stabilizer. The contents of the reactor are equilibrated at 80° C. and the benzoyl chloride dissolved by thorough agitation Toluene diisocyanate (TDI; 80 percent 2,4-isomer and 20 percent 2,6-isomer; 38.71 g), is added by syringe to the reactor under nitrogen cover. The contents of the reactor are stirred at 80° C. for one hour.

The prepolymer is then analyzed for isocyanate content (ASTM D-1638-74). A sample (1.938 g) is dissolved in dry dimethyl formamide (25 ml) and treated with an excess of a standard di-n-butylamine solution in dry toluene (0.2 N, 50 ml) for 15 minutes at ambient temperature with stirring. Additional dry dimethyl formamide (25 ml) is added and the excess amine is titrated using 0.1 N HCl. The weight percent isocyanate is found to be 11.20.

1A(16). Preparation of a Urethane/Urea Polymer From an Isocyanate-Functional Prepolymer.

The isocyanate-functional prepolymer of Example 1A(15) (104.62 g) is thoroughly degassed under vacuum and quickly poured into a 150-ml plastic cup. Two drops (about 30 mg) of a catalyst solution are added (10.0 weight percent dibutyltin dilaurate in poly(propylene glycol) of 2000 molecular weight). 1,4-Butanediol (12.6 g, distilled from CaH$_2$) which had been thoroughly degassed under vacuum is added quickly to give a 1.05 index (molar ratio of isocyanate:hydroxyl=1.05). The mixture is stirred rapidly for 34 seconds and then poured into a preheated mold (6.0"×6.0"×0.125"). The sample is then cured at 121° C. (250° C.) for one hour. A urethane/urea plastic plaque is obtained upon demolding.

1B. Preparation of a Diamine Containing One Urea Moiety per Average Backbone Molecule; Molecular Weight=2562.

A diamine containing about one urea moiety per average backbone molecule is prepared by reacting an aminated poly(propylene glycol) with a number average molecular weight of 1207 (2704.8 g, 2.16 moles) with urea (64.8 g, 1.08 moles) in the same reactor setup used in Example 1A(6). The ammonia formed during the reaction is directed into an aqueous scrubber. The reactor is heated at 150° C. for 18 hours, cooled to ambient temperature and treated on a rotary evaporator at 90° C. under 20 mm Hg vacuum for 3 hours. The product is a light yellow, viscous liquid with the following properties: basicity, 0.781 meq/g: molecular weight by end group titration, 2562; Brookfield viscosity, 1,138 cps. $^{13}$C nuclear magnetic resonance indicates the presence of internal urea carbonyl moieties (157.8 ppm), the methylene carbon is attached to urea (—CH(CH$_3$)NHC(0)NH—, 45.7 ppm), and the methylene carbon attached to the amino end groups (—CH(CH$_3$)NH$_2$, 46.8 ppm).

1C. Preparation of a Diamine Containing About One Urea Moiety per Average Backbone Molecule; Molecular Weight=4120.

A diamine containing about one urea moiety per average backbone molecule is prepared by reacting Jeffamine TM D-2000 (4024.6 g, 1.89 moles) with urea (56.78 g, 0.95 mole) in the same reactor setup used in Example 1A(6). The ammonia formed during the reaction is directed into an aqueous scrubber. The reactor is heated at 150° C. for 16 hours, cooled to ambient temperature and treated on a rotary evaporator at 90° C. under a 20 mm Hg vacuum for 3 hours. The product is a light yellow, viscous liquid with the following properties: basicity, 0.485 meq/g; molecular weight by end group titration, 4120; Brookfield viscosity, 1,840 cps. $^{13}$C nuclear magnetic resonance indicates the presence of internal urea moieties (157.8 ppm) and amino end groups.

1D. Preparation of a Diamine Containing Two Amide Moieties per Average Backbone Molecule; Molecular Weight=920.

A diamine containing 2 amide moieties per average backbone molecule is prepared by reacting Jeffamine TM D-400 (1716.0 g, 4.00 moles) with adipic acid (292.0 g, 2.00 moles) in a 3-liter reactor equipped with an overhead stirrer, thermometer, condenser, a Dean Stark trap, a temperature controller and maintained under a nitrogen cover. The reactor is heated to 125° C. to dissolve the reactants by forming the corresponding amine salt. Toluene (150 ml) is added and the reactor is heated at 152° C. to 162° C. for 10 hours while separating the water-toluene azeotropically boiling mixture. The reactor is then heated at 162° C. to 170° C. and 2 mm Hg vacuum for 4 hours to remove the toluene and any residual water. The product is a light yellow, viscous liquid with the following properties: basicity, 2.176 meq/g; molecular weight by end group titration, 920; Brookfield viscosity, 3,250 cps. $^{13}$C nuclear magnetic resonance indicates the presence of internal amide moieties (172.1 ppm).

1E. Preparation of a Diamine Based on Jeffamine TM D-400 and Adipic Acid; Molecular Weight=2004.

A diamine containing about 6 amide moieties per average backbone molecule is prepared by reacting Jeffamine TM D-400 (2094.0 g, 4.93 moles) with adipic acid (554.1 g, 3.79 moles) in the same equipment used in Example 1D. The reactor is heated to 125° C. to dissolve the reactants by forming the corresponding amine salt. Toluene (150 ml) is added and the reactor is heated at 150° C. to 171° C. for 16 hours while separating the water-toluene azeotropically boiling mixture. The reactor is then heated at 162° C. to 170° C. and 2 mm Hg vacuum for 4 hours to remove the toluene and any residual water. The product is a light yellow, viscous liquid with the following properties: basicity, 0.998 meq/g; molecular weight by end group titration, 2004; Brookfield viscosity, 113,800 cps at 25° C.; Tg −37° C. $^{13}$C nuclear magnetic resonance indicates the presence of internal amide moieties (172.1 ppm).

1F. Preparation of a Diamine Based on Jeffamine TM D-230 and Adipic Acid; Molecular Weight=1889.

A diamine containing about 10 amide moieties per average backbone molecule is prepared by reacting Jeffamine TM D-230 (2203.6 g, 9.163 moles; an aminated poly(propylene glycol) with a number average molecular weight of about 230, manufactured by the Jefferson Chemical Division of Texaco) with adipic acid (1115.9 g, 7.636 moles) in the same equipment used in Example 1D, except using a 5-liter reactor. The reactor is heated to 125° C. to dissolve the reactants by forming the corresponding amine salt. Toluene (225 ml) is added and the reactor is heated at 150° C. to 170° C. for 16 hours while separating the water-toluene azeotropically boiling mixture. The reactor is then heated at 162° C. to 170° C. and 2 mm Hg vacuum for 4 hours to remove the toluene and any residual water. The product is a light yellow, very viscous glass with the following properties: basicity, 1.059 meq/g; molecular weight by end group titration, 1889; Brookfield viscosity, >2,000,000 cps at 25° C. $^{13}$C nuclear magnetic resonance indicates the presence of internal amide moieties (172.1 ppm).

1G. Preparation of a Diamine Based on Jeffamine TM D-2000 and Adipic Acid; Molecular Weight=9542.

A diamine containing about 6 amide moieties per average backbone molecule is prepared by reacting Jeffamine TM D-2000 (3500.0 g, 1.719 moles) with adipic acid (193.5 g, 1.322 moles) in the same equipment used in Example 1F. The reactor is heated to 125° C. to dissolve the reactants by forming the corresponding amine salt. Toluene (225 ml) is added and the reactor is heated at 150° C. to 170° C. for 16 hours while separating the water-toluene azeotropically boiling mixture. The reactor is then heated at 162° C. to 170° C. and 2 mm Hg vacuum for 4 hours to remove the toluene and any residual water. The product is a light yellow, viscous liquid with the following properties: basicity, 0.2096 meq/g; molecular weight by end group titration, 9542; Brookfield viscosity, 26,300 cps at 25° C. $^{13}$C nuclear magnetic resonance indicates the presence of internal amide moieties (172.1 ppm).

1H. Preparation of a Diamine Based on Jeffamine TM D-400 and Adipic Acid; Molecular Weight=3133.

A diamine containing about 9.5 amide moieties per average backbone molecule is prepared by reacting Jeffamine TM D-400 (544.80 g, 1.20 moles) with adipic acid (146.14 g, 1.00 mole) in the same equipment used in Example 1D except the flask was 1-liter. The reactor is heated to 140° C. to dissolve the reactants by forming the corresponding amine salt. Toluene (50 ml) is added and the reactor is heated at 157° C. to 161° C. for 20 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.638 meq/g which corresponds to a molecular weight of 3133. The number of amide moieties per average molecule is calculated to be about 9.5.

1I. Preparation of a Diamine Based on Jeffamine TM D-400 and Adipic Acid; Molecular Weight=5259.

A diamine containing about 17.1 amide moieties per average backbone molecule is prepared by reacting Jeffamine TM D-400 (499.40 g, 1.10 moles) with adipic acid (146.14 g, 1.00 mole) in the same equipment used in Example 1H. The reactor is heated to 140° C. to dissolve the reactants by forming the corresponding amine salt. Toluene (50 ml) is added and the reactor is heated at 157° C. to 160° C. for 22 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.380 meq/g which corresponds to a molecular weight of 5259. The number of amide moieties per average molecule is calculated to be about 17.1.

1J. Preparation of a Diamine Based on Jeffamine TM D-400 and Adipic Acid; Molecular Weight=10,413.

A diamine containing about 35.3 amide moieties per average backbone molecule is prepared by reacting Jeffamine TM D-400 (476.70 g, 1.05 moles) with adipic acid (146.14 g, 1.00 mole) in the same equipment used in Example 1H. The reactor is heated to 140° C. to dissolve the reactants by forming the corresponding amine salt. Toluene (50 ml) is added and the reactor is heated at 157° C. to 166° C. for 65 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.192 meq/g which corresponds to a molecular weight of 10,413. The number of amide moieties per average molecule is calculated to be about 35.3.

1K. Preparation of a Diamine Containing About Six Amide Moieties per Average Backbone Molecule Based on D-400/D-2000 Blends: Molecular Weight=4828.

A diamine containing about 8 amide moieties per average backbone molecule is prepared by reacting Jeffamine ™ D-400 (1372.6 g, 3.006 moles) and Jeffamine ™ D-2000 (1499.1 g; 0.7515 mole) with adipic acid (439.3 g, 3.006 moles) in the same equipment used in Example 1F. The reactor is heated to 140° C. to dissolve the reactants by forming the corresponding amine salt. Toluene (150 ml) is added and the reactor is heated at 157° C. to 166° C. for 48 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.414 meq/g which corresponds to a molecular weight of 4828.

1L. Preparation of a Diamine Containing About Six Amide Moieties per Average Backbone Molecule Based on D-400/D-2000 Blends; Molecular Weight=5565.

A diamine containing about 8 amide moieties per average backbone molecule is prepared by reacting Jeffamine ™ D-400 (984.4 g, 2.155 moles) and Jeffamine ™ D-2000 (2897.6 g; 1.437 moles) with adipic acid (420.1 g, 2.875 moles) in the same equipment used in Example 1F. The reactor is heated to 140° C. to dissolve the reactants by forming the corresponding amine salt. Toluene (150 ml) is added and the reactor is heated at 157° C. to 164° C. for 48 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.359 meq/g which corresponds to a molecular weight of 5565.

1M. Preparation of a Diamine Containing About Six Amide Moieties per Average Backbone Molecule Based on D-400/D-2000 Blends; Molecular Weight=7282.

A diamine containing about 8 amide moieties per average backbone molecule is prepared by reacting Jeffamine ™ D-400 (421.2 g, 0.9225 mole) and Jeffamine ™ D-2000 (2760.1 g; 1.384 moles) with adipic acid (269.61 g, 1.845 moles) in the same equipment used in Example 1F. The reactor is heated to 140° C. to dissolve the reactants by forming the corresponding amine salt. Toluene (150 ml) is added and the reactor is heated at 157° C. to 164° C. for 48 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.275 meq/g which corresponds to a molecular weight of 7282.

1N. Preparation of a Diamine Containing About Five Amide Moieties per Average Backbone Molecule Based on Sebacic Acid; Molecular Weight=7909.

A diamine containing about 5 amide moieties per average backbone molecule is prepared by reacting Jeffamine ™ D-2000 (3220.7 g; 1.588 moles) with sebacic acid (240.9 g, 1.191 moles) in the same equipment used in Example 1F. The reactor is heated to 140° C. to dissolve the reactants by forming the corresponding amine salt. Toluene (150 ml) is added and the reactor is heated at 155° C. to 164° C. for 48 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.252 meq/g which corresponds to a molecular weight of 7909.

10. Preparation of a Diamine Containing About Eight Amide Moieties per Average Backbone Molecule Based on Sebacic Acid; Molecular Weight=2604.

A diamine containing about 8 amide moieties per average backbone molecule is prepared by reacting Jeffamine ™ D-400 (2518 4 g; 5.902 moles) with sebacic acid (895.3 g, 4.427 moles) in the same equipment used in Example 1F. The reactor is heated to 140° C. to dissolve the reactants by forming the corresponding amine salt. Toluene (150 ml) is added and the reactor is heated at 155° C. to 164° C. for 48 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.768 meq/g which corresponds to a molecular weight of 2604.

1P. Preparation of a Diamine Containing About Eight Amide Moieties per Average Backbone Molecule Based on Adipic Acid; Molecular Weight=9289.

A diamine containing about 8 amide moieties per average backbone molecule is prepared by reacting Jeffamine ™ D-2000 (3320.8 g; 1.626 moles) with adipic acid (182.8 g, 1.251 moles) in the same equipment used in Example 1F. The reactor is heated to 140° C. to dissolve the reactants by forming the corresponding amine salt. Toluene (150 ml) is added and the reactor is heated at 155° C. to 164° C. for 48 hours while separating the water-toluene azeotropically boiling mixture. The reactor is then heated to 190° C. and the bulk of the toluene removed. The crude product is then heated at 100° C. under a 15-mm Hg vacuum for 5 hours to remove residual toluene. The product is a light yellow, viscous liquid with a basicity of 0.215 meq/g which corresponds to a molecular weight of 9289.

Example 2

2A. Preparation of a Diamine Containing Four Biuret Moieties per Average Backbone Molecule; Molecular Weight=2240.

Jeffamine ™ D-400 (2121.0 g, 5.00 moles) and biuret (412.3 g, 4.00 moles), at a D-400:biuret molar ratio=1.25 are combined in the same reactor setup used in Example 1A(1). The contents of the flask are heated at 150° C. for 8 hours during which time ammonia is evolved and passed into an aqueous scrubber. The resultant slurry is treated on a rotary evaporator at 90° C. under a 20 mm Hg vacuum to finish the reaction and remove all of the ammonia by-product. The slurry is then filtered to a clear, light yellow, viscous liquid product having an amine content of 0.893 meq/g which corresponds to a molecular weight of 2240 by end group analysis: Brookfield viscosity, 287,600 cps. $^{13}$C nuclear magnetic resonance analysis shows internal biuret moieties (155.0 ppm) in the backbone and amino end groups.

2B. Preparation of an Isocyanate-Functional Prepolymer Based on a Biuret Backbone Diamine and MDI.

The diamine containing about 4 biuret moieties per average molecule of Example 2A (75.90 g) is placed in a 100-ml resin pot equipped with thermometer, overhead stirrer, temperature controlled at 80° C. by an oil bath and maintained under a nitrogen atmosphere. One drop (about 15 mg) of benzoyl chloride is added as a prepolymer stabilizer. The contents of the reactor are equilibrated at 80° C. and the benzoyl chloride dissolved by thorough agitation. Freshly distilled 4,4'-methylenedi(phenyl-isocyanate) (MDI, 44.20 g, Isonate TM 125M, manufactured by The Dow Chemical Company), is added by syringe to the reactor under nitrogen cover. The contents of the reactor are stirred at 80° C. for one hour.

The prepolymer is then analyzed for isocyanate content (ASTM D-1638-74). A sample (1.608 g) is dissolved in dry dimethyl formamide (25 ml) and treated with an excess of a standard di-n-butylamine solution in dry toluene (0.2 N, 50 ml) for 15 minutes at ambient temperature with stirring. Additional dry dimethyl formamide (25 ml) is added and the excess amine is titrated using 0.1 N HCl. The weight percent isocyanate is found to be 10.25.

2C. Preparation of a Urethane/Urea Polymer From an Isocyanate-Functional Prepolymer.

The isocyanate-functional prepolymer of Example 2B (104.80 g) is thoroughly degassed under vacuum and quickly poured into a 150-ml plastic cup. Two drops (about 30 mg) of a catalyst solution are added (10.0 weight percent dibutyltin dilaurate in poly(propylene glycol) of 2000 molecular weight). 1,4-Butanediol (11.2 g, distilled from $CaH_2$) which had been thoroughly degassed under vacuum is added quickly to give a 1.05 index (molar ratio of isocyanate:hydroxyl = 1.05). The mixture is stirred rapidly for 28 seconds and then poured into a preheated mold (6.0"×6.0"×0.125"). The sample is then cured at 121° C. (250° F.) for one hour. A urethane/urea plastic plaque is obtained upon demolding.

Example 3

Preparation of a Diamine Containing About Two Biuret Moieties per Average Backbone Molecule; Molecular Weight=928

A diamine containing about 2 biuret moieties per average backbone molecule is prepared by reacting Jeffamine TM D-400 (2070.4 g, 4.86 moles) with biuret (250.3 g, 2.43 moles) in the same reactor setup used in Example 1A(1). The ammonia formed during the reaction is directed into an aqueous scrubber. The reactor is heated at 150° C. for 2.5 hours, cooled to ambient temperature, treated on a rotary evaporator at 90° C. under a 20 mm Hg vacuum for 3 hours and filtered. The product is a light yellow, viscous liquid with the following properties: basicity, 2.155 meq/g; molecular weight by end group titration, 928; Brookfield viscosity, 2,440 cps. $^{13}C$ nuclear magnetic resonance indicates the presence of internal biuret moieties (154.6 ppm) and amino end groups.

Example 4

Preparation of a Diamine Containing Four Biuret Moieties per Average Backbone Molecule: Molecular; Molecular Weight=2065

A diamine containing about 4 biuret moieties per average backbone molecule is prepared by reacting Jeffamine TM D-400 (2060.2 g, 4.80 moles) with biuret (370.8 g, 3.60 moles) in the same reactor setup used in Example 1A(1). The ammonia formed during the reaction is directed into an aqueous scrubber. The reactor is heated at 150° C. for 7.0 hours, cooled to ambient temperature, treated on a rotary evaporator at 90° C. under a 20 mm Hg vacuum for 3 hours and filtered. The product is a light yellow, viscous liquid with the following properties: basicity, 0.968 meq/g; molecular weight by end group titration, 2065; Brookfield viscosity, 179,400 cps. $^{13}C$ nuclear magnetic resonance indicates the presence of internal biuret moieties (154.8 ppm) and amino end groups.

Example 5

Preparation of a Diamine Containing One Biuret Moiety per Average Backbone Molecule; Molecular Weight=2819

A diamine containing about one biuret moiety per average backbone molecule is prepared by reacting an aminated poly(propylene glycol) with a number average molecular weight of 1207 (1750.4 g, 1.405 moles) with biuret (72.38 g, 0.702 mole) in the same reactor setup used in Example 1A(1). The ammonia formed during the reaction is directed into an aqueous scrubber. The reactor is heated at 150° C. for 8.0 hours, cooled to ambient temperature, treated on a rotary evaporator at 90° C. under a 20 mm Hg vacuum for 3 hours and filtered. The product is a light yellow, viscous liquid with the following properties: basicity, 0.710 meq/g; molecular weight by end group titration, 2819: Brookfield viscosity, 2,528 cps. $^{13}C$ nuclear magnetic resonance indicates the presence of internal biuret moieties (154.8 ppm) and amino end groups.

Example 6

Preparation of a Diamine Containing About Four Biuret Moieties per Average Backbone Molecule; Molecular Weight=11,173

A diamine containing about 4 biuret moieties per average backbone molecule is prepared by reacting Jeffamine TM D-2000 (3900.7 g, 1.83 moles) with biuret (151.2 g, 1.47 moles) in the same reactor setup used in Example 1A(6). The ammonia formed during the reaction is directed into an aqueous scrubber. The reactor is heated at 150° C. for 8.0 hours, cooled to ambient temperature, treated on a rotary evaporator at 90° C. under a 20 mm Hg vacuum for 3 hours and filtered. The product is a light yellow, viscous liquid with the following properties: basicity, 0.179 meq/g; molecular weight by end group titration, 11,173; Brookfield viscosity, 39,000 cps. $^{13}C$ nuclear magnetic resonance indicates the presence of internal biuret moieties (154.8 ppm) and amino end groups.

Example 7

Preparation of a Diamine Containing Polyoxybutylene Moieties and Four Biuret Moieties per Average Backbone Molecule; Molecular Weight=10,516

A diamine containing about 4 biuret moieties per average backbone molecule is prepared by reacting an aminated poly(butylene glycol) with a number average molecular weight of 2070 (329.46 g, 0.1591 mole) with biuret (13.12 g, 0.1273 mole) in the same reactor setup used in Example 1A(2) except using a 500-ml flask. The ammonia formed during the reaction is directed into an aqueous scrubber. The reactor is heated at 150° C. for 24 hours, cooled to ambient temperature, treated on a rotary evaporator at 90° C. under a 20 mm Hg vacuum for 3 hours and filtered. The product is a light yellow, viscous liquid with the following properties: basicity, 0.1902 meq/g; molecular weight by end group titration, 10,516; Brookfield viscosity, 47,100 cps. This example shows that polyoxybutylene moieties can be incorporated into polymer backbone Example 8

8(A) Preparation of a Diamine Containing About Three Thiourea Moieties per Average Molecule; Molecular Weight = 2192.

A diamine containing about 3 thiourea moieties per average backbone molecule is prepared by reacting Jeffamine ™ D-400 (3127.9 g, 6.850 moles) with thiourea (434.5 g, 5.709 moles; D-400:thiourea molar ratio = 1.20:1) in the same reaction setup used in Example 1A(6). The contents of the flask are heated at 175° C. for 24 hours. The ammonia formed during the reaction is directed into an aqueous scrubber. The reactor is then cooled to ambient temperature and treated batchwise on a rotary evaporator at 90° C. under a 20 mm Hg vacuum for 3 hours. The product is a light yellow, viscous liquid with the following properties: basicity, 0.9122 meq/g; molecular weight by end group titration, 2192; 3.05 thiourea moieties/molecule by perchloric acid titration; Brookfield viscosity, 43,500 cps at 25° C. $^{13}C$ NMR shows the carbonyl carbon at 181.4 ppm.

8(B). Preparation of a Diamine Containing About Four Thiourea Moieties per Average Molecule; Molecular Weight = 12,400.

A diamine containing about 4 thiourea moieties per average backbone molecule is prepared by reacting Jeffamine ™ D-2000 (3233.2 g, 1.622 moles) with thiourea (102.0 g, 1.351 moles; D-2000:thiourea molar ratio = 1.20:1) in the same reaction setup used in Example 1A(6). The contents of the flask are heated at 175° C. for 24 hours. The ammonia formed during the reaction is directed into an aqueous scrubber. The reactor is then cooled to ambient temperature and treated batchwise on a rotary evaporator at 90° C. under a 20 mm Hg vacuum for 3 hours. The product is a light yellow, viscous liquid with the following properties: basicity, 0.161 meq/g; molecular weight by end group titration; Brookfield viscosity, 29,750 cps at 25° C. $^{13}C$ NMR shows the carbonyl carbon at 181.4 ppm.

8(C). Preparation of a Diamine Containing About Two Thiourea Moieties per Average Molecule; Molecular Weight = 1667.

A diamine containing about 2 thiourea moieties per average backbone molecule is prepared by reacting Jeffamine ™ D-400 (323.8 g, 0.709 mole) with thiourea (41.5 g, 0.546 mole; D-400:thiourea molar ratio = 1.30:1) in the same reaction setup used in Example 1A(2). The contents of the flask are heated at 150° C. for 71 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 1.200 meq/g; molecular weight by end group titration; Brookfield viscosity, 21,050 cps at 25° C. $^{13}C$ NMR shows the carbonyl carbon at 181.4 ppm.

8(D). Preparation of a Diamine Containing About Two Thiourea Moieties per Average Molecule; Molecular Weight = 1734.

A diamine containing about 2 thiourea moieties per average backbone molecule is prepared by reacting Jeffamine ™ D-400 (456.6 g, 0.693 mole) with thiourea (40.5 g, 0.533 mole; D-400:thiourea molar ratio = 1.30:1) in the same reaction setup used in Example 1A(2). The contents of the flask are heated at 175° C. for 22 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 1.153 meq/g; molecular weight by end group titration, 1734; 2.50 thiourea moieties/molecule by perchloric acid titration; Brookfield viscosity, 23,100 cps at 25° C. $^{13}C$ NMR shows the carbonyl carbon at 181.4 ppm.

8(E). Preparation of a Diamine Containing About Three Thiourea Moieties per Average Molecule; Molecular Weight = 2051.

A diamine containing about 3 thiourea moieties per average backbone molecule is prepared by reacting Jeffamine ™ D-400 (342 7 g, 0.750 mole) with thiourea (47.6 g, 0.625 mole: D-400:thiourea molar ratio = 1.20:1) in the same reaction setup used in Example 1A(2). The contents of the flask are heated at 175° C. for 22 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.975 meq/g; molecular weight by end group titration, 2051; 3.12 thiourea moieties/molecule by perchloric acid titration; Brookfield viscosity, 31,050 cps at 25° C. $^{13}C$ NMR shows the carbonyl carbon at 181.4 ppm.

8(F). Preparation of a Diamine Containing About Three Thiourea Moieties per Average Molecule; Molecular Weight = 8799.

A diamine containing about 3 thiourea moieties per average backbone molecule is prepared by reacting Jeffamine ™ D-2000 (332.1 g, 0.167 mole; an aminated poly(propylene glycol) of 1995 number average molecular weight, a product of Texaco) with thiourea (10.6 g, 0.139 mole; D-2000:thiourea molar ratio = 1.20:1) in the same reaction setup used in Example 1A(2). The contents of the flask are heated at 175° C. for 21 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties basicity, 0.227 meq/g; molecular weight by end group titration, 8799; 3.31 thiourea moieties/molecule by perchloric acid titration; Brookfield viscosity, 12,540 cps at 25° C. $^{13}C$ NMR shows the carbonyl carbon at 181.4 ppm.

8(G). Preparation of a Diamine Containing About One Thiourea Moiety per Average Molecule; Molecular Weight = 898.

A diamine containing about one thiourea moiety per average backbone molecule is prepared by reacting Jeffamine ™ D-400 (1427.5 g, 3.126 mole)s with thiourea (119.0 g, 0.563 mole; D-400:thiourea molar ratio = 2.00:1) in the same reaction setup used in Example 1A(1) except that a 2-liter reactor was used. The contents of the flask are heated at 175° C. for 5 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 2.227 meq/g; molecular weight by end group titration, 898; 0.93 thiourea moieties/molecule by perchloric acid titration; Brookfield viscosity, 932 cps at 25° C. $^{13}$C NMR shows the carbonyl carbon at 181.4 ppm.

8(H). Scaled Up Preparation of a Diamine Containing About Four Thiourea Moieties per Average Molecule; Molecular Weight=2218.

A diamine containing about 4 thiourea moieties per average backbone molecule is prepared by reacting Jeffamine ™ D-400 (3335.9 g, 7.306 moles) with thiourea (463.4 g, 6.088 moles; D-400:thiourea molar ratio=1.20:1) in the same reaction setup used in Example 1A(6). The contents of the flask are heated at 175° C. for 20 hours. The ammonia formed during the reaction is directed into an aqueous scrubber. The reactor is then cooled to ambient temperature and treated batchwise on a rotary evaporator at 90° C. under a 20 mm Hg vacuum for 3 hours. The product is a light yellow, viscous liquid with the following properties: basicity, 0.902 meq/g; molecular weight by end group titration, 2218; 2.97 thiourea moieties/molecule by perchloric acid titration; Brookfield viscosity, 55,000 cps at 24° C. $^{13}$C NMR shows the carbonyl carbon at 181.4 ppm.

8(I). Scaled Up Preparation of a Diamine Containing About Four Thiourea Moieties per Average Molecule; Molecular Weight=12,400.

A diamine containing about 4 thiourea moieties per average backbone molecule is prepared by reacting Jeffamine ™ D-2000 (3233.2 g, 1.622 moles) with thiourea (102.9 g, 1.351 mole;s D-2000:thiourea molar ratio=1.20:1) in the same reaction setup used in Example 1A(6). The contents of the flask are heated at 175° C. for 24 hours. The ammonia formed during the reaction is directed into an aqueous scrubber. The reactor is then cooled to ambient temperature and treated batchwise on a rotary evaporator at 90° C. under a 20 mm Hg vacuum for 3 hours. The product is a light yellow, viscous liquid with the following properties: basicity, 0.161 meq/g; molecular weight by end group titration, 12,400; 3.70 thiourea moieties/molecule by perchloric acid titration; Brookfield viscosity, 29,750 cps at 25° C. $^{13}$C NMR shows the carbonyl carbon at 181.4 ppm.

Example 9

Preparation of a Diamine Containing About Four Thiourea Moieties per Average Molecule and a Poly(oxybutylene) Backbone; Molecular Weight=10,905.

A diamine containing about 4 thiourea moieties per average backbone molecule is prepared by reacting an aminated poly(butylene glycol) of 2071 number average molecular weight (328.2 g, 0.159 mole) with thiourea (10.05 g, 0.132 mole; diamine:thiourea molar ratio=1.20:1) in the same reaction setup used in Example 1A(2). The contents of the flask are heated at 175° C. for 22 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 0.183 meq/g; molecular weight by end group titration, 10,905; 4.11 thiourea moieties/molecule by perchloric acid titration; Brookfield viscosity, 14,780 cps at 25° C. $^{13}$C NMR shows the carbonyl carbon at 181.4 ppm.

Example 10

Preparation of a Diamine Containing Two Biuret Moieties and One Urea Moiety per Average Backbone Molecule; Molecular Weight=1890.

A diamine containing 2 biuret moieties per average backbone molecule is first prepared by reacting Jeffamine ™ D-400 (2070.4 g, 4.86 moles) with biuret (250.3 g, 2.43 moles) in the same reactor setup used in Example 1A(6). The ammonia formed during the reaction is directed into an aqueous scrubber. The reactor is heated at 150° C. for 2.5 hours, cooled to ambient temperature and filtered. The product is a light yellow, viscous liquid with the following properties: basicity, 2.155 meq/g; molecular weight by end group titration, 2440. $^{13}$C nuclear magnetic resonance indicates the presence of internal biuret moieties (154.6 ppm).

The diamine prepared above containing 2 biuret moieties per average backbone molecule (2052.1 g, 2.21 moles) and urea (66.34 g, 1.10 moles) are combined in the same reactor used above. The reactor is heated at 135° C. for 20 hours. The content of the reactor is then treated on a rotary evaporator at 20 mm Hg vacuum to remove residual ammonia. The product is a light yellow, viscous liquid with the following properties: basicity, 1.058 meq/g; molecular weight by end group titration, 1890; Brookfield viscosity, 57,400 cps; Tg −38° C. $^{13}$C nuclear magnetic resonance indicates the presence of internal biuret moieties (154.6 ppm) and internal urea moieties (158.0).

This example demonstrates the preparation of a diamine containing both urea and biuret moieties in its backbone.

Example 11

Preparation of a Diamine Containing Four Amide Moieties and One Biuret Moiety per Average Backbone Molecule; Molecular Weight =2046.

A diamine containing 2 amide moieties per average backbone molecule is first prepared by reacting Jeffamine ™ D-400 (1716.0 g, 4.00 moles) with adipic acid (292.0 g, 2.00 moles) in the same reactor setup used in Example 1D. The reactor is heated to 125° C. to dissolve the reactants by forming the corresponding amine salt. Toluene (150 ml) is added and the reactor is heated at 152° C. to 162° C. for 10 hours while separating the water-toluene azeotropically boiling mixture The reactor is then heated at 162° C. to 170° C. and 2 mm Hg vacuum for 4 hours to remove the toluene and any residual water. The product is a light yellow, viscous liquid with the following properties: basicity, 2.176 meq/g; molecular weight by end group titration, 3250. $^{13}$C nuclear magnetic resonance indicates the presence of internal amide moieties (172.1 ppm).

The diamine prepared above containing 2 amide moieties per average backbone molecule (1809.4 g, 1.967 moles) and biuret (101.32 g, 0.984 mole) are combined in the same reactor used in Example 1C. The reactor is heated at 150° C. for 7 hours. The content of the reactor is then treated on a rotary evaporator at 20 mm Hg vacuum to remove residual ammonia. The product is a light yellow, viscous liquid with the following properties: basicity, 0.978 meq/g; molecular weight by end group titration, 2046; Brookfield viscosity, 148,800 cps; Tg −36° C. $^{13}$C nuclear magnetic resonance indicates the presence of both internal biuret moieties (154.6 ppm) and internal amide moieties (172 5).

This example demonstrates the preparation of a diamine containing both amide and biuret moieties in its backbone.

Example 12

Preparation of a Diamine Containing Four Amide Moieties and One Urea Moiety per Average Backbone Molecule; Molecular Weight=1956.

A diamine containing 2 amide moieties per average backbone molecule is first prepared by reacting Jeffamine TM D-400 (784.8 g, 1.80 moles) with adipic acid (131.53 g, 0.90 mole) in the same reactor setup used in Example 1H. The reactor is heated to 125° C. to dissolve the reactants by forming the corresponding amine salt. Toluene (150 ml) is added and the reactor is heated at 152° C. to 162° C. for 10 hours while separating the water-toluene azeotropically boiling mixture. The reactor is then heated at 162° C. to 170° C. and 2 mm Hg vacuum for 4 hours to remove the toluene and any residual water. The product is a light yellow, viscous liquid with the following properties: basicity, 2.161 meq/g; molecular weight by end group titration, 925; Brookfield viscosity, 2950. $^{13}$C nuclear magnetic resonance indicates the presence of internal amide moieties (172.3 ppm).

The diamine prepared above containing 2 amide moieties per average backbone molecule (393.83 g, 0.426 mole) and urea (12.75 g, 0.213 mole) are combined in a one-liter flask equipped in the same way as the reactor used in Example 10. The reactor is heated at 150° C. for 17 hours. The content of the reactor is then treated on a rotary evaporator at 20 mm Hg vacuum to remove residual ammonia. The product is a light yellow, viscous liquid with the following properties: basicity, 1.022 meq/g; molecular weight by end group titration, 1956; Brookfield viscosity, 93,200; Tg −40° C. $^{13}$C nuclear magnetic resonance indicates the presence of both internal urea moieties (158.0 ppm) and internal amide moieties (172.5 ppm).

This example demonstrates the preparation of a diamine containing both amide and urea moieties in its backbone.

Example 13

Preparation of a Diamine Containing both Thiourea and Urea Moieties in the same Molecule; Molecular Weight=1656.

A diamine containing both thiourea moieties and urea moieties in the same molecule is prepared by reacting a portion of the product from Example 8(G) (345 1 g, 0.378 mole) with urea (11.34 g, 0.189 mole) in the same reaction setup used in Example 1A(2). The contents of the flask are heated at 175° C. for 5 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 1.208 meq/g; molecular weight by end group titration, 1656; 2.56 thiourea plus urea moieties/molecule by perchloric acid titration; Brookfield viscosity, 15,800 cps at 25° C. $^{13}$C NMR shows the thiourea carbonyl carbon at 181.4 ppm and the urea carbonyl carbon at 157.8 ppm.

Example 14

Preparation of a Diamine Containing both Thiourea and Biuret Moieties in the same Molecule; Molecular Weight=1831.

A diamine containing both thiourea moieties and biuret moieties in the same molecule is prepared by reacting a portion of the product from Example 8(G) (356.2 g, 0.390 mole) with biuret (20.09 g, 0.195 mole) in the same reaction setup used in Example 1A(2). The contents of the flask are heated at 150° C. for 21 hours. The ammonia formed during the reaction is directed into an aqueous scrubber. The reactor is then cooled to ambient temperature and treated on a rotary evaporator at 90° C. under a 20 mm Hg vacuum for 3 hours. The product is a light yellow, viscous liquid with the following properties: basicity, 1.092 meq/g; molecular weight by end group titration, 1831; 1.92 thiourea moieties/molecule by perchloric acid titration; Brookfield viscosity, 35,950 cps at 25° C. $^{13}$C NMR shows the thiourea carbonyl carbon at 181.4 ppm and the biuret carbonyl carbon at 154.7 ppm.

Example 15

Preparation of a Diamine Containing both Thiourea and Amide Moieties in the same Molecule; Molecular Weight=2005.

A diamine containing both thiourea moieties and amide moieties in the same molecule is prepared by reacting a portion of the Example 8(G) (346.2 g, 0.379 mole) with adipic acid (27.68 g, 0.189 mole) in the same reaction setup used in Example 1H. The contents of the flask are heated at 140° C. for 30 minutes to form the salt intermediate. Toluene (30 ml) was added and the reactor was heated at gentle reflux for 21 hours while collecting 6.7 ml of water (theory=6.8 ml) in the trap. The majority of the toluene is removed from the trap by increasing the reactor temperature to 185° C. The reactor is then cooled to ambient temperature and treated on a rotary evaporator at 90° C. under a 10 mm Hg vacuum for 5 hours. The product is a light yellow, viscous liquid with the following properties: basicity, 0.998 meq/g; molecular weight by end group titration, 2005; Brookfield viscosity, 19,550 cps at 25° C. $^{13}$C NMR shows the thiourea carbonyl carbon at 181.4 ppm and the amide carbonyl carbon at 172.3 ppm.

Example 16

Scaled Up Preparation of a Diamine Containing both Thiourea and Amide Moieties in the Same Molecule: Molecular Weight=1716.

A diamine containing about one thiourea moiety per average backbone molecule is prepared by reacting Jeffamine TM D-400 (3201.2 g, 6.995 moles) with thiourea (266.2 g, 3.498 moles: D-400:thiourea molar ratio=2.00:1) in the same reaction setup used in Example 1A(6). The contents of the flask are heated at 175° C. for 21 hours. The ammonia formed during the reaction is directed into an aqueous scrubber. The product is a light yellow, viscous liquid with the following properties: basicity, 2.190 meq/g; molecular weight by end group titration, 913; 0.91 thiourea moieties/molecule by perchloric acid titration.

Adipic acid (267.7 g, 1 832 moles) is added to the reactor and a Dean Stark trap is added below the condenser. The contents of the flask are heated at 140° C. for 30 minutes to form the salt intermediate. Toluene (250 moles) is added and the reactor is heated at gentle reflux for 48 hours while collecting water in the trap. The majority of the toluene is removed from the trap by increasing the reactor temperature to 185° C. The reactor is then cooled to ambient temperature and treated batchwise on a rotary evaporator at 90° C. under a 10 mm Hg vacuum for 5 hours. The product is a light yellow, viscous liquid with the following properties: basicity, 1.682 meq/g; molecular weight by end group titration, 1716; Brookfield viscosity, 20,600 cps at 23° C. $^{13}C$ NMR shows the thiourea carbonyl carbon at 181.4 ppm and the amide carbonyl carbon at 172.3 ppm.

Example 17

Preparation of a Polymer Based on a 50:50 Weight Percent Blend of Jeffamine TM D-2000 and a Diamine Containing Four Urea Moieties per Average Backbone Molecule A small scale reaction injection molding (RIM) machine is used to fabricate parts suitable for physical property testing. The machine consists of two chemical tanks (2-liter volume) and a pumping system capable of dispensing precise quantities of each component into a mixhead where the components are rapidly mixed and sent through an aftermixer into a heated mold (4"×8"×0.125"). The following machine conditions are employed: component delivery pressure, 2000 psig (A and B side); throughput, 35 lb/min; peanut aftermixer; mold temperature, 165° C.; demold time, 60 seconds; A side temperature, 35° C. to 38° C.; B side temperature, 56° C. to 60° C.

A formulation is employed in which Isonate TM 143L (a methylene(diphenyldiisocyanate) which contains about 15 percent dimer; a product manufactured by The Dow Chemical Company) is used on the A side and a blend of Jeffamine TM D-2000 (461.6 g), the product of Example 1A(12) (461.6 g) and diethyltoluenediamine (576.8 g) are used on the B Side. An A:B weight ratio of 0.742 is used to produce a 60 volume percent hard segment part at an index of 1.03. A series of well mixed parts are obtained having useful physical properties as shown in Example 48. Properties are measured after the parts are allowed to age for 14 days at ambient temperature or after the parts are post-cured for one hour at 175° C.

Example 18

Preparation of a Polymer Based on a Diamine Containing Four Urea Moieties per Average Backbone Molecule; Molecular Weight=1912.

The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 35° C. to 40° C.; B side temperature, 60° C. to 65° C.

A formulation is employed in which Isonate TM 143L is used on the A side and the product of Example 1A(12) (923.7 g) and diethyltoluenediamine (576.2 g) are used on the B side. An A:B weight ratio of 0.743 is used to produce a 60 volume percent hard segment part at an index of 1.03. A series of well mixed parts are obtained having useful physical properties as shown in Example 48.

Example 19

Preparation of a Polymer Based on a Diamine Containing One Urea Moiety per Average Backbone Molecule; Molecular Weight=2562.

The same small scale RIM equipment is used that was used in Example 17. The following machine conditions are employed: component delivery pressure, 2000 psig (A and B side): throughput, 35 lb/min; peanut aftermixer; mold temperature, 165° C.; demold time, 60 seconds; A side temperature, 35° C. to 38° C.; B side temperature, 40° C. to 45° C.

A formulation is employed in which Isonate TM 143L is used on the A side and the product of Example 1B (915.4 g) and diethyltoluenediamine (584.6 g) are used on the B side. An A:B weight ratio of 0.727 is used to produce a 60 volume percent hard segment part at an index of 1.03. A series of well mixed parts are obtained having useful physical properties as shown in Example 48.

Example 20

Preparation of a Polymer Based on a Diamine Containing One Urea Moiety per Average Backbone Molecule; Molecular Weight=4120.

The same small scale RIM equipment is used that was used in Example 17. The following machine conditions are employed: component delivery pressure, 2000 psig (A and B side): throughput, 35 lb/min; peanut aftermixter; mold temperature, 165° C.; demold time, 60 seconds; A side temperature, 32° C. to 35° C.; B side temperature, 50° C. to 55° C.

A formulation is employed in which Isonate TM 143L is used on the A side and the product of Example 1C (906.8 g) and diethyltoluenediamine (593.2 g) are used on the B side. An A:B weight ratio of 0.711 is used to produce a 60 volume percent hard segment part at an index of 1.03. A series of well mixed parts are obtained having useful physical properties as shown in Example 48.

Example 21

Preparation of a Polymer Based on a Diamine Containing Four Urea Moieties per Average Backbone Molecule; Molecular Weight=9866.

The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 32° C. to 35° C.; B side temperature, 65° C. to 75° C.

A formulation is employed in which Isonate TM 143L is used on the A side and the product of Example 1A(1) (898.2 g) and diethyltoluenediamine (601.8 g) are used on the B side. An A:B weight ratio of 0.695 is used to produce a 60 volume percent hard segment part at an index of 1.03. A series of well mixed parts are obtained having useful physical properties.

Example 22

Preparation of a Polymer Based on a 90:10 Weight Percent Blend of Jeffamine TM D-2000 and a Diamine Containing Four Biuret Moieties per Average Backbone Molecule The same small scale RIM equipment is used that was used in Example 17. The following machine conditions are employed: component delivery pressure, 2000 psig (A and B side); throughput, 35 lb/min; peanut aftermixter; mold temperature, 165° C.; demold time, 60 seconds: A side temperature, 35° C. to 38° C.; B side temperature, 40° C. to 44° C.

A formulation is employed in which Isonate TM 143L is used on the A side and a blend of Jeffamine TM D-2000 (829.7 g), the product of Example 2A (92.2 g) and diethyltoluenediamine (578.1 g) are used on the B side. An A:B weight ratio of 0.739 is used to produce a 60 volume percent hard segment part at an index of 1.03. A series of well mixed parts are obtained having useful physical properties as shown in Example 48.

Example 23

Preparation of a Polymer Based on an 80:20 Weight Percent Blend of Jeffamine TM D-2000 and a Diamine Containing Four Biuret Moieties per Average Backbone Molecule The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 30° C. to 34° C.; B side temperature, 41° C. to 46° C.

A formulation is employed in which Isonate TM 143L is used on the A side and a blend of Jeffamine TM D-2000 (737.3 g), the product of Example 2A (184.3 g) and diethyltoluenediamine (578.3 g) is used on the B side. An A:B weight ratio of 0.739 is used to produce a 60 volume percent hard segment part at an index of 1.03. A series of well mixed parts are obtained having useful physical properties as shown in Example 48.

Example 24

Preparation of a Polymer Based on a 60:40 Weight Percent Blend of Jeffamine TM D-2000 and a Diamine Containing Four Biuret Moieties per Average Backbone Molecule The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 33° C. to 40° C.; B side temperature 42° C. to 53° C.

A formulation is employed in which Isonate TM 143L is used on the A side and a blend of Jeffamine TM D-2000 (552.7 g), the product of Example 2A (368.4 g) and diethyltoluenediamine (578.9 g) is used on the B side. An A:B weight ratio of 0.738 is used to produce a 60 volume percent hard segment part at an index of 1.03. A series of well mixed parts are obtained having useful physical properties as shown in Example 48.

Example 25

Preparation of a Polymer Based on a Diamine Containing Four Biuret Moieties per Average Backbone Molecule The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 40° C. to 42° C.; B side temperature, 84° C. to 92° C.

A formulation is employed in which Isonate TM 143L is used on the A side and a blend of a diamine containing four biuret moieties per average backbone molecule (918.9 g, prepared by a procedure similar to that used in Example 2A, molecular weight by end group titration is 2236) and diethyltoluenediamine (581.1 g) are used on the B side. An A:B weight ratio of 0.734 is used to produce a 60 volume percent hard segment part at an index of 1.03. A series of parts are obtained having useful physical properties as shown in Example 48.

Example 26

Preparation of a Polymer Based on a 50:50 Weight Percent Blend of Jeffamine TM D-2000 and a Diamine Containing Four Biuret Moieties per Average Backbone Molecule and Having a Molecular Weight of 11,173

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 60 seconds; A side temperature, 38° C. to 40° C.; B side temperature 75° C. to 85° C.

A formulation is employed in which Isonate TM 143L is used on the A side and a blend of Jeffamine TM D-2000 (455.4 g), the product of Example 6 (455.4 g) and diethyltoluenediamine (589.3 g) are used on the B side. An A:B weight ratio of 0.718 is used to produce a 60 volume percent hard segment part at an index of 1.03. A series of well mixed parts are obtained having useful physical properties.

Example 27

Preparation of a Polymer Based on a Diamine Containing One Biuret Moiety per Average Backbone Molecule The same small scale RIM equipment is used that was used in Example 17. The following machine conditions are employed: component delivery pressure, 2000 psig (A and B side); throughput, 35 lb/min; peanut aftermixer mold temperature, 165° C.; demold time, 60 seconds; A side temperature, 40° C. to 42° C.; B side temperature, 45° C. to 51° C.

A formulation is employed in which Isonate TM 143L is used on the A side and a blend of the diamine containing one biuret moiety per average backbone molecule prepared in Example 5 (913.7 g) and diethyltoluenediamine (586.3 g) are used on the B side. An A:B weight ratio of 0.724 is used to produce a 60 volume percent hard segment part at an index of 1.03. A series of well mixed parts are obtained having useful physical properties.

Example 28

Preparation of a Polymer Based on a Diamine Containing About Three Thiourea Moieties per Average Backbone Molecule; Mold Temperature = 120° C.

The same small scale reaction injection molding (RIM) machine is used to fabricate parts suitable for physical property testing that was used in Example 17. The following machine conditions are employed: component delivery pressure, 2000 psig (A and B side); throughput, 35 lb/min; harp aftermixer; mold temperature, 120° C.; demold time, 60 seconds; A side temperature, 33° C. to 36° C.; B side temperature, 73° C. to 78° C.

A formulation is employed in which Isonate TM 143L (a methylene(diphenyldiisocyanate) which contains about 15% dimer and a small amount of highers; a product manufactured by The Dow Chemical Company) is used on the A side and a blend of the product of Example 8(A) (918.8 g) and diethyltoluenediamine (581.2 g) are used on the B side. An A:B weight ratio of 0.733 is used to produce 60 volume percent hard segment parts at an index of 1.03. The parts have very good green strength at demold. A series of well mixed parts are obtained having useful physical properties as shown hereinbelow.

Example 29

Preparation of a Polymer Based on 50/50 Weight Percent Blend of Jeffamine TM D-2000 and a Diamine Containing About Three Thiourea Moieties per Average Backbone Molecule; Mold Temperature = 120° C.

The same small scale RIM equipment is used that was used in Example 17. The following machine conditions are employed: component delivery pressure, 2000 psig (A and B side); throughput, 35 lb/min; harp aftermixer; mold temperature, 120° C.; demold time, 60 seconds; A side temperature, 36° C. to 40° C.; B side temperature, 68° C. to 75° C.

A formulation is employed in which Isonate TM 143L is used on the A side and a blend of Jeffamine TM D-2000 (460.9 g; an aminated poly(propylene glycol) of 1995 number average molecular weight, a product of Texaco), the product of Example 8(A) (460.9 g) and diethyltoluenediamine (578.3 g) is used on the B side. An A:B weight ratio of 0.739 is used to produce 60 volume percent hard segment parts at an index of 1.03. The parts have good green strength at demold. A series of well mixed parts are obtained having useful physical properties as shown hereinbelow. Example 30

Preparation of a Polymer Based on a 50/50 Weight Percent Blend of Jeffamine TM D-2000 and a Diamine Containing About Three Thiourea Moieties per Average Backbone Molecule; Mold Temperature = 165° C.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 60 seconds; A side temperature, 36° C. to 40° C.; B side temperature, 68° C. to 75° C.

A formulation is employed in which Isonate TM 143L is used on the A side and a blend of Jeffamine TM D-2000 (460.9 g), the product of Example 8(A), and diethyltoluenediamine (578.3 g) is used on the B side. An A:B weight ratio of 0.739 is used to produce 60 volume percent hard segment parts at an index of 1.03. The parts have excellent green strength at demold. A series of well mixed parts are obtained having useful physical properties as shown hereinbelow.

Example 31

Preparation of a Polymer Based on a Diamine Containing About Four Thiourea Moieties per Average Backbone Molecule; Mold Temperature = 165° C.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 60 seconds; A side temperature, 37° C. to 40° C.; B side temperature, 78° C. to 82° C.

A formulation is employed in which Isonate TM 143L is used on the A side and a blend of the product of Example 8(B) (895.9 g) and diethyltoluenediamine (604.1 g) is used on the B side. An A:B weight ratio of 0.690 is used to produce 60 volume percent hard segment parts at an index of 1.03. The parts have relatively poor green strength at demold; some cracking occurs in the mold. A series of well mixed parts are obtained.

Comparative Example 1

Preparation of a Polymer Based on Jeffamine TM D-2000; Mold Temperature = 120° C.

The same small scale RIM equipment is used that was used in Example 17. The following machine conditions are employed: component delivery pressure, 2000 psig (A and B side); throughput, 35 lb/min; harp aftermixer; mold temperature, 120° C.; demold time, 60 seconds; A side temperature, 29° C. to 32° C.; B side temperature, 67° C. to 75° C.

A formulation is employed in which Isonate TM 143L is used on the A side and a blend of Jeffamine TM D-2000 (921.6 g) and diethyltoluenediamine (578.4 g) is used on the B side. An A:B weight ratio of 0.739 is used to produce 60 volume percent hard segment parts at an index of 1.03. The parts have extremely poor green strength at demold; multiple cracking occurs in the mold making property testing impossible.

Comparative Example 2

Preparation of a Polymer Based on Jeffamine TM D-2000; Mold Temperature = 165° C.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 60 seconds; A side temperature, 29° C. to 32° C.; B side temperature, 7° C. to 75° C.

A formulation is employed in which Isonate TM 143L is used on the A side and a blend of Jeffamine TM D-2000 (921.6 g) and diethyltoluenediamine (578.4 g) is used on the B side. An A:B weight ratio of 0.739 is used to produce 60 volume percent hard segment parts at an index of 1.03. The parts have marginal poor green strength at demold and must be handled very carefully to prevent cracking.

Example 32

Preparation of a Polymer Based on a 50:50 Weight Percent Blend of Jeffamine TM D-2000 and a Diamine Containing Six Amide Moieties per Average Backbone Molecule The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 60 seconds; A side temperature, 30° C. to 39° C.; B side temperature, 80° C. to 85° C.

A formulation is employed in which Isonate TM 143L is used on the A side and a mixture of Jeffamine TM D-2000 (461.8 g), the polyamide diamine of Example 1E (461.8 g) and diethyltoluenediamine (575.4 g) are used on the B side. An A:B weight ratio of 0.742 is used to produce a 60 volume percent hard segment part at an index of 1.03. A series of well mixed parts are obtained having useful physical properties as shown in Example 48.

Example 33

Preparation of a Polymer Based on a 75:25 Weight Percent Blend of Jeffamine TM D-2000 and a Diamine Containing Six Amide Moieties per Average Backbone Molecule The same small scale RIM equipment is used that was used in Example 17. The following machine conditions are employed: component delivery pressure, 2000 psig (A and B side); throughput, 35 lb/min; harp aftermixter; mold temperature, 165° C.; demold time, 60 seconds; A side temperature, 36° C. to 38° C.; B side temperature, 80 ° C. to 88° C.

A formulation is employed in which Isonate TM 143L is used on the A side and a blend of Jeffamine TM D-2000 (692.5 g), the product of Example 1E (230.8 g) and diethyltoluenediamine (576.6 g) is used on the B side. An A:B weight ratio of 0.742 is used to produce a 60 volume percent hard segment part at an index of 1.03. A series of well mixed parts are obtained having useful physical properties as shown in Example 48.

Example 34

Preparation of a Polymer Based on a 90:10 Weight Percent Blend of Jeffamine TM D-2000 and a Diamine Containing Six Amide Moieties per Average Backbone Molecule The same small scale RIM equipment is used that was used in Example 17. The following machine conditions are employed: component delivery pressure, 2000 psig (A and B side); throughput, 35 lb/min; harp aftermixter; mold temperature, 165° C.; demold time, 60 seconds; A side temperature, 35° C. to 38° C.; B side temperature, 62° C. to 69° C.

A formulation is employed in which Isonate TM 143L is used on the A side and a blend of Jeffamine TM D-2000 (831.0 g), the product of Example 1E (92.3 g) and diethyltoluenediamine (576.7 g) are used on the B side. An A:B weight ratio of 0.742 is used to produce a 60 volume percent hard segment part at an index of 1.03. A series of well mixed parts are obtained having useful physical properties as shown in Example 48.

Example 35

Preparation of a Polymer Based on a Diamine Containing Two Biuret Moieties and One Urea Moiety per Average Backbone Molecule The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 30° C. to 35° C.; B side temperature, 95° C. to 105° C.

A formulation is employed in which Isonate TM 143L is used on the A side and a mixture of the product of Example 10 (924.6 g) and diethyltoluenediamine (575.4 g) are used on the B side. An A:B weight ratio of 0.744 is used to produce a 60 volume percent hard segment part at an index of 1.03. A series of well mixed parts are obtained having useful physical properties as shown in Example 48.

Example 36

Preparation of a Polymer Based on a 50:50 Weight Percent Mixture of Jeffamine TM D-2000 and a Diamine Containing Two Biuret Moieties and One Urea Moiety per Average Backbone Molecule The same small scale RIM equipment is used that was used in Example 17. The following machine conditions are employed: component delivery pressure, 2000 psig (A and B side); throughput, 35 lb/min; peanut aftermixer; mold temperature, 165° C.; demold time, 60 seconds; A side temperature, 30° C. to 35° C.; B side temperature, 70° C. to 80° C.

A formulation is employed in which Isonate TM 143L is used on the A side and a mixture of the product of Example 10 (461.7 g), Jeffamine TM D-2000 (461.7 g) and diethyltoluenediamine (575.4 g) are used on the B side. An A:B weight ratio of 0.742 is used to produce a 60 volume percent hard segment part at an index of 1.03. A series of well mixed parts are obtained having useful physical properties as shown in Example 48.

Example 37

Preparation of Polymers Based on a Diamine Containing Eight Amide Moieties per Average Backbone Molecule The same small scale RIM equipment is used that was used in Example 17. The following machine conditions are employed: component delivery pressure, 2000 psig (A and B side); throughput, 35 lb/min; harp aftermixter; mold temperature, 165° C.; demold time, 60 seconds; A side temperature, 30° C. to 35° C.; B side temperature, 76° C. to 81° C.

A formulation is employed in which Isonate TM 143L is used on the A side and the product of Example 1E (914.5 g) and diethyltoluenediamine (585.5 g) are used on the B side. An A:B weight ratio of 0.725 is used to produce a 60 volume percent hard segment part at an index of 1.03. The parts are very tough at demold and have excellent green strength. A series of well mixed parts are obtained having useful physical properties as shown in Example 48.

The above experiment is repeated using a mold temperature of 120° C. Parts are produced having good green strength at demold. The above experiment is repeated using a mold temperature of 100° C. Green strength is still sufficient to produce good parts without cracking. This experiment demonstrates that the mold temperature can be lowered considerably by using some of the compositions of this invention.

Example 38

Preparation of Polymers Based on a Diamine Containing Eight Amide Moieties per Average Backbone Molecule; Molecular Weight=4828.

The same small scale RIM equipment is used that was used in Example 17. The following machine conditions are employed: component delivery pressure, 2000 psig (A and B side); throughput, 35 lb/min; harp aftermixter; mold temperature, 165° C.; demold time, 60 seconds; A side temperature, 38° C. to 42° C.; B side temperature, 75° C. to 82° C.

A formulation is employed in which Isonate TM 143L is used on the A side and the product of Example 1K (903.5 g) and diethyltoluenediamine (596.5 g) are used on the B side. An A:B weight ratio of 0.705 is used to produce a 60 volume percent hard segment part at an index of 1.03. The parts are very tough at demold and have excellent green strength. A series of well mixed parts are obtained having useful physical properties as shown in Example 48.

Example 39

Preparation of Polymers Based on a Diamine Containing Eight Amide Moieties per Average Backbone Molecule; Molecular Weight=5565.

The same small scale RIM equipment is used that was used in Example 17. The following machine conditions are employed: component delivery pressure, 2000 psig (A and B side); throughput, 35 lb/min; harp aftermixter; mold temperature, 165° C.; demold time, 60 seconds; A side temperature, 35° C. to 40° C.; B side temperature, 78° C. to 85° C.

A formulation is employed in which Isonate TM 143L is used on the A side and the product of Example 1L (901.8 g) and diethyltoluenediamine (598.2 g) are used on the B side. An A:B weight ratio of 0.701 is used to produce a 60 volume percent hard segment part at an index of 1.03. The parts are very tough at demold and have excellent green strength. A series of well mixed parts are obtained having useful physical properties as shown in Example 48.

Example 40

Preparation of Polymers Based on a Diamine Containing Eight Amide Moieties per Average Backbone Molecule Molecular Weight=7282.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 60 seconds; A side temperature, 37° C. to 41° C.; B side temperature, 75° C. to 81° C.

A formulation is employed in which Isonate TM 143L is used on the A side and the product of Example 1M (899.3 g) and diethyltoluenediamine (600.7 g) are used on the B side. An A:B weight ratio of 0.697 is used to produce a 60 volume percent hard segment part at an index of 1.03. The parts are very tough at demold and have excellent green strength. A series of well mixed parts are obtained having useful physical properties as shown in Example 48.

Example 41

Preparation of Polymers Based on a Diamine Containing Eight Amide Moieties per Average Backbone Molecule; Molecular Weight=9289.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 8 seconds; A side temperature, 42° C. to 46° C.; B side temperature, 73° C. to 78° C.

A formulation is employed in which Isonate TM 143L is used on the A side and the product of Example 1P (897.6 g) and diethyltoluenediamine (602.4 g) are used on the B side. An A:B weight ratio of 0.697 is used to produce a 60 volume percent hard segment part at an index of 1.03. A series of well mixed parts are obtained having useful physical properties as shown in Example 48.

Example 42

Preparation of Polymers Based on a Diamine Containing Five Amide Moieties per Average Backbone Molecule; Molecular Weight=7909.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 8 seconds; A side temperature, 36° C. to 40° C.; B side temperature, 68° C. to 74° C.

A formulation is employed in which Isonate TM 143L is used on the A side and the product of Example 1N (898.7 g) and diethyltoluenediamine (601.3 g) are used on the B side. An A:B weight ratio of 0.696 is used to produce a 60 volume percent hard segment part at an index of 1.03. A series of well mixed parts are obtained having useful physical properties as shown in Example 48.

Example 43

Preparation of Polymers Based on a Diamine Containing Four Urea Moieties per Average Backbone Molecule; Molecular Weight=3367.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 8 seconds; A side temperature, 38° C. to 40° C.; B side temperature, 75° C. to 80° C.

A formulation is employed in which Isonate TM 143L is used on the A side and the product of Example 1A(6) (908.9 g) and diethyltoluenediamine (591.1 g) are used on the B side. An A:B weight ratio of 0.715 is used to produce a 60 volume percent hard segment part at an index of 1.03. A series of well mixed parts are obtained having useful physical properties as shown in Example 48.

Example 44

Preparation of Polymers Based on a Diamine Containing Four Urea Moieties per Average Backbone Molecule; Molecular Weight=4710.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 8 seconds; A side temperature, 40° C. to 42° C.; B side temperature, 76° C. to 82° C.

A formulation is employed in which Isonate TM 143L is used on the A side and the product of Example 1A(7) (903.8 g) and diethyltoluenediamine (596.2 g) are used on the B side. An A:B weight ratio of 0.705 is used to produce a 60 volume percent hard segment part at an index of 1.03. A series of well mixed parts are obtained having useful physical properties as shown in Example 48.

Example 45

Preparation of Polymers Based on a Diamine Containing Four Urea Moieties per Average Backbone Molecule; Molecular Weight=6326.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 8 seconds; A side temperature, 35° C. to 42° C.; B side temperature, 82° C. to 88° C.

A formulation is employed in which Isonate TM 143L is used on the A side and the product of Example 1A(8) (900.5 g) and diethyltoluenediamine (599.5 g) are used on the B side. An A:B weight ratio of 0.699 is used to produce a 60 volume percent hard segment part at an index of 1.03. A series of well mixed parts are obtained having useful physical properties as shown in Example 48.

Example 46

Preparation of Polymers Based on a Diamine Containing Four Urea Moieties per Average Backbone Molecule; Molecular Weight=11,119.

The same small scale RIM equipment is used that was used in Example 17. The following machine conditions are employed: component delivery pressure, 2000 psig (A and B side); throughput, 35 lb/min; harp aftermixer; mold temperature, 165° C.; demold time, 8 seconds; A side temperature, 44° C. to 47° C.; B side temperature, 62° C. to 68° C.

A formulation is employed in which Isonate TM 143L is used on the A side and the product of Example 1A(9) (896.5 g) and diethyltoluenediamine (603.5 g) are used on the B side. An A:B weight ratio of 0.691 is used to produce a 60 volume percent hard segment part at an index of 1.03. A series of well mixed parts are obtained having useful physical properties as shown in Example 48.

Example 47

Preparation of a Polymer Based on a Diamine Containing About Three Urea Moieties per Average Backbone Molecule The same small scale reaction injection molding (RIM) machine is used to fabricate parts that was used in Example 17. The following machine conditions are employed component delivery pressures, 2000 psig (A and B side); throughput, 35 lb/min; harp aftermixer; mold temperature, 165° C.; demold time, 60 seconds; A side temperature, 38° C. to 40° C.; B side temperature, 75° C. to 80° C.

A formulation is employed in which Isonate TM 143L (1072.5 g) is used on the A side and a blend of the product of Example 1A(6) (908.9 g) and diethyltoluenediamine (591.1 g) are used on the B-side. An A:B weight ratio of 0.715 is used to produce a 60 volume percent hard segment part at an index of 1.03. A series of well mixed parts are obtained having useful physical properties.

Example 48

Measurement of Physical Properties

Plaques are cured for two weeks at ambient temperature or post-cured for one hour at 175° C. prior to physical testing. Properties are compared relative to Jeffamine TM D-2000, since D-2000 has the same polypropyleneoxy backbone, the same primary amino end groups and approximately the same molecular weight as many of the novel compositions of this invention. Results are given in Tables I, II, and III.

Example 49

Preparation of a Diamine Containing About Seven Urea Moieties in its Backbone Based on Jeffamine TM D-400 and 2-Methyl-1,5-pentanediamine; 5:1 Molar Ratio Jeffamine TM D-400 (690.0 g, 1.500 moles, MW=460, an aminated poly(propylene glycol) manufactured by Texaco), 2-methyl-1,5-pentanediamine (34.87 g, 0.300 mole) and urea (99.12 g, 1.650 moles) are combined in a 1000-ml reactor equipped with an overhead stirrer, thermometer, condenser, and temperature controller and maintained under a nitrogen atmosphere. The reactor is heated at 150° C. for 28 hours. The product is obtained as a viscous liquid: Brookfield viscosity=436,000 cps at 22° C.; 0.6223 meq amine/g and 6.9 urea moieties/molecule by titration with 0.1 N HClO$_4$; calculated average molecular weight is 3214 by end group titration. Carbon-13 NMR (DMSO-d$_6$) shows urea carbonyls (157.4 ppm, D-400/D-400 urea; 158.0/158.1 ppm, D-400/2-Me-PDA urea; and 158.6 ppm, 2-Me-PDA/2-Me-PDA urea).

This example shows the preparation of a diamine product which contains three different kinds of urea moieties in its backbone. The different urea moieties result from the two different diamines used in its preparation.

Example 50

Preparation of a Diamine Containing About Three Urea Moieties in its Backbone Based on Jeffamine TM D-400 and 2-Methyl-1,5-pentanediamine; 5:1 Molar Ratio Jeffamine TM D-400 (230.0 g, 0.500 mole), 2-methyl-1,5-pentanediamine (11.67 g, 0.100 mole) and urea (30.03 g, 0.500 mole) are combined in the same reaction setup used in Example 49, except a 500-ml reactor is used. The reactor is heated at 150° C. for 23 hours. The product is obtained as a viscous liquid: Brookfield viscosity=47,250 cps at 22° C.; 1.2009 meq amine/g and 3.2 urea moieties/molecule by titration with 0.1 N HClO$_4$; calculated average molecular weight is 1666 by end group titration. Carbon-13 NMR (DMSO-d$_6$) shows urea carbonyls (157.4 ppm, D-400/D-400 urea; 158.0/158.1 ppm, D-400/2-Me-PDA urea; and 158.6 ppm, 2-Me-PDA/2-Me-PDA urea).

This example shows the preparation of a diamine product which contains three different kinds of urea moieties in its backbone. The different urea moieties result from the two different diamines used in its preparation.

Example 51

Preparation of a Diamine Containing About Four Urea Moieties in its Backbone Based on Jeffamine TM D-400 and 2-Methyl-1,5-pentanediamine; 11:1 Molar Ratio Jeffamine TM D-400 (253.05 g, 0.550 mole), 2-methyl-1,5-pentanediamine (5.84 g, 0.050 mole) and urea (30.04 g, 0.500 mole) are combined in the same reaction setup used in Example 50. The reactor is heated at 150° C. for 24 hours. The product is obtained as a viscous liquid: Brookfield viscosity=130,400 cps at 22° C.; 0.8604 meq amine/g and 4.2 urea moieties/molecule by titration with 0.1 N HClO$_4$; calculated average molecular weight is 2325 by end group titration. Carbon-13 NMR (DMSO-d$_6$) shows urea carbonyls (157.4 ppm, D-400/D-400 urea; 158.0/158.1 ppm, D-400/2-Me-PDA urea; and 158.6 ppm, 2-Me-PDA/2-Me-PDA urea).

This example shows the preparation of a diamine product which contains three different kinds of urea moieties in its backbone. The different urea moieties result from the two different diamines used in its preparation.

Example 52

Preparation of a Diamine Containing About Six Urea Moieties in its Backbone Based on Jeffamine TM D-400 and 2-Methyl-1,5-pentanediamine; 0.83:1 Molar Ratio Jeffamine TM D-400 (115.05 g, 0.250 mole), 2-methyl-1,5-pentanediamine (34.87 g, 0.300 mole) and urea (30.07 g, 0.500 mole) are combined in the same reaction setup used in Example 50. The reactor is heated at 150° C. for 22 hours. The product is obtained as a viscous liquid: Brookfield viscosity = >2,000,000 cps at 22° C.; 0.9042 meq amine/g by titration with 0.1 N HClO$_4$; calculated average molecular weight is 2212 by end group titration. Carbon-13 NMR (DMSO-d$_6$) shows urea carbonyls (157.5 ppm, D-400/D-400 urea; 158.1/158.2 ppm, D-400/2-Me-PDA urea; and 158.8 ppm, 2-Me-PDA/2-Me-PDA urea).

This example shows the preparation of a diamine product which contains three different kinds of urea moieties in its backbone. The different urea moieties result from the two different diamines used in its preparation.

Example 53

Preparation of a Diamine Containing About Twenty Urea Moieties in its Backbone Based on Jeffamine ™ D-400 and 2-Methyl-1,5-pentanediamine; 0.20:1 Molar Ratio Jeffamine ™ D-400 (92.12 g, 0.200 mole), 2-methyl-1,5-pentanediamine (116.21 g, 1.000 mole) and urea (68.67 g, 1.143 moles) are combined in the same reaction setup used in Example 50. The reactor is heated at 150° C. for 24 hours. The product is obtained as a viscous liquid: Brookfield viscosity = >2,000,000 cps at 22° C.; 0.6045 meq amine/g by titration with 0.1 N HClO$_4$; calculated average molecular weight is 3309 by end group titration. Carbon-13 NMR (DMSO-d$_6$) shows urea carbonyls (157.4 ppm, D-400/D-400 urea; 158.0/158.1 ppm, D-400/2-Me-PDA urea; and 158.6 ppm, 2-Me-PDA/2-Me-PDA urea).

This example shows the preparation of a diamine product which contains three different kinds of urea moieties in its backbone. The different urea moieties result from the two different diamines used in its preparation.

Example 54

Preparation of a Diamine Containing About Four Urea Moieties in its Backbone Based on Jeffamine ™ D-400 and 1,6-Hexanediamine; 11:1 Molar Ratio Jeffamine ™ D-400 (253.09 g, 0.550 mole), 1,6-hexanediamine (5.87 g, 0.050 mole) and urea (30.05 g 0.500 mole) are combined in the same reaction setup used in Example 50. The reactor is heated at 150° C. for 24 hours. The product is obtained as a viscous liquid: Brookfield viscosity = >2,000,000 cps at 22° C.; 0.9075 meq amine/g and 4.0 urea moieties/molecule by titration with 0.1 N HClO$_4$; calculated average molecular weight is 2204 by end group titration. Carbon-13 NMR (DMSO-d$_6$) shows urea carbonyls (157.4 ppm, D-400/D-400 urea; 157.9 ppm, D-400/HDA urea; and 158.6 ppm, HDA/HDA urea).

This example shows the preparation of a diamine product which contains three different kinds of urea moieties in its backbone. The different urea moieties result from the two different diamines used in its preparation.

Example 55

Preparation of a Diamine Containing About Five Urea Moieties in its Backbone Based on Jeffamine ™ D-400 and 1,6-Hexanediamine; 5:1 Molar Ratio Jeffamine ™ D-400 (230.01 g, 0.500 mole), 1,6-hexanediamine (11.67 g, 0.100 mole) and urea (30.03 g, 0.500 mole) are combined in the same reaction setup used in Example 50. The reactor is heated at 150° C. for 24 hours. The product is obtained as a viscous liquid: Brookfield viscosity = >2,000,000 cps at 22° C.; 1.1189 meq amine/g by titration with 0.1 N HClO$_4$; calculated average molecular weight is 1787 by end group titration. Carbon-13 NMR (DMSO-d$_6$) shows urea carbonyls (157.4 ppm, D-400/D-400 urea; 158.0 ppm, D-400/HDA urea; and 158.7 ppm, HDA/HDA urea).

This example shows the preparation of a diamine product which contains three different kinds of urea moieties in its backbone. The different urea moieties result from the two different diamines used in its preparation.

Example 56

Preparation of a Diamine Containing About Four Urea Moieties in its Backbone Based on Jeffamine ™ D-400 and 2,4-Diaminotoluene; 11:1 Molar Ratio Jeffamine ™ D-400 (253.02 g, 0.550 mole), 2,4toluenediamine (6.11 g, 0.050 mole) and urea (30.04 g, 0.500 mole) are combined in the same reaction setup used in Example 50. The reactor is heated at 150° C. for 25 hours. The product is obtained as a viscous liquid: Brookfield viscosity = 153,600 cps at 22° C.; 0.9073 meq amine/g by titration with 0.1 N HClO$_4$; calculated average molecular weight is 2204 by end group titration. Carbon-13 NMR (DMSO-d$_6$) shows urea carbonyls (157.4 ppm and 158.6 ppm). This example shows the preparation of a diamine product which contains aromatic urea moieties in its backbone.

Example 57

Preparation of a Diamine Containing About Six Urea Moieties in its Backbone Based on Jeffamine ™ D-400 and 2,4-Diaminotoluene; 5:1 Molar Ratio Jeffamine ™ D-400 (230.02 g, 0.500 mole), 2,4toluenediamine (12.23 g, 0.100 mole) and urea (32.21 g, 0.536 mole) are combined in the same reaction setup used in Example 50. The reactor is heated at 150° C. for 24 hours. The product is obtained as a viscous liquid: Brookfield viscosity = 715,600 cps at 22° C.; 0.7809 meq amine/g by titration with 0.1 N HClO$_4$; calculated average molecular weight is 2561 by end group titration. Carbon-13 NMR (DMSO-d$_6$) shows urea carbonyls (157.4 ppm and 158.6 ppm). This example shows the preparation of a diamine product which contains aromatic urea moieties in its backbone.

Example 58

Preparation of a Diamine Containing About Four Urea and Four Biuret Moieties in its Backbone Based on Jeffamine ™ D-400 and 2-Methyl-1,5-pentanediamine; 0.83:1 Molar Ratio Jeffamine ™ D-400 (115.05 g, 0.250 mole), 2-methyl-1,5-pentanediamine (34.87 g, 0.300 mole), biuret (25.77 g, 0.250 mole) and urea (15.02 g, 0.250 mole) are combined in the same reaction setup used in Example 50. The reactor is heated at 150° C. for 24 hours. The product is obtained as a viscous liquid: Brookfield viscosity = >2,000,000 cps at 22° C.; 0.5751 meq amine/g by titration with 0.1 N HClO$_4$; calculated average molecular weight is 3478 by end group titration. Carbon-13 NMR (DMSO-d$_6$) shows urea carbonyls (157.6 ppm, D-400/D-400 urea; 158.3/158.4 ppm, D-400/2-Me-PDA urea; and 158.9 ppm, 2-Me-PDA/2-Me-PDA urea) and biuret carbonyls (154.5 ppm, D-400/D-400 biuret; and 155.0–155.5 ppm, D-400/2-Me-PDA biuret and 2-Me-PDA/2-Me-PDA biuret).

This example shows the preparation of a diamine product which contains three different kinds of biuret moieties in its backbone. These moieties result from the two different diamines and two different carbonyl-containing materials used in its preparation.

Example 59

Preparation of a Diamine Containing About Eight Biuret Moieties in its Backbone Based on Jeffamine ™ D-400 and 2-Methyl-1,5-pentanediamine; 0.83:1 Molar Ratio Jeffamine ™ D-400 (115.09 g, 0.250 mole), 2-methyl-1,5-pentanediamine (34.89 g, 0.300 mole) and biuret (51.55 g, 0.500 mole) are combined in the same reaction setup used in Example 50. The reactor is heated at 150° C. for 24 hours. The product is obtained as a viscous liquid: Brookfield viscosity = >2,000,000 ps at 22° C.; 0.5573 meq amine/g by titration with 0.1 N $HClO_4$; calculated average molecular weight is 3589 by end group titration. Carbon-13 NMR (DMSO-$d_6$) shows biuret carbonyls (154.5 ppm, D-400/D-400 biuret; and 154.9-155.4 ppm, D-400/2-Me-PDA biuret and 2-Me-PDA/-2-Me-PDA biuret).

This example shows the preparation of a diamine product which contains three different kinds of biuret moieties in its backbone. The different biuret moieties result from the two different diamines used in its preparation.

Example 60

Preparation of a Diamine Containing About Ten Amide Moieties in its Backbone Based on Jeffamine ™ D-400 and 2-Methyl-1,5-pentanediamine; 5:1 Molar Ratio Jeffamine ™ D-400 (230.00 g, 0.500 mole), 2-methyl-1,5-pentanediamine (11.69 g, 0.100 mole) and adipic acid (73.09 g, 0.500 mole) are combined in the same reaction setup used in Example 50, except that a Dean Stark water trap is added between the reactor and condenser. The reactor is heated at 120° C. for 1 hour to form the corresponding salt. Toluene (50 ml) is added and the system is heated at reflux (175° C) for 24 hours. Toluene is removed at reduced pressure (2 hr/150° C./1 mm Hg). The product is obtained as a viscous liquid: Brookfield viscosity = >2,000,000 cps at 22° C.; 0.7046 meq amine/g by titration with 0.1 N $HClO_4$; calculated average molecular weight is 2838 by end group titration. Carbon-13 NMR (DMSO-$d_6$) shows amide carbonyls (171.8 ppm, D-400 amide; and 172.2/172.4 ppm, 2-Me-PDA amide).

This example shows the preparation of a diamine product which contains two different kinds of amide moieties in its backbone. The different amide moieties result from the two different diamines used in its preparation.

Example 61

Preparation of a Diamine Containing About Twelve Amide Moieties in its Backbone Based on Jeffamine ™ D-400 and 2-Methyl-1,5-pentanediamine; 5:1 Molar Ratio Jeffamine ™ D-400 (460.00 g, 1.000 mole), 2-methyl-1,5-pentanediamine (23.26 g, 0.200 mole) and adipic acid (140.31 g, 0.960 mole) are combined in the same reaction setup used in Example 60, except that a one-liter reactor is used. The reactor is heated at 120° C. for 1 hour to form the corresponding salt. Toluene (75 ml) is added and the system is heated at reflux (165° C.) for 24 hours. Toluene is removed at reduced pressure (2 hr/150° C./1 mm Hg). The product is obtained as a viscous liquid: Brookfield viscosity = >2,000,000 cps at 22° C.; 0.8330 meq amine/g by titration with 0.1 N $HClO_4$; calculated average molecular weight is 2401 by end group titration. Carbon-13 NMR (DMSO-$d_6$) shows amide carbonyls (171.8 ppm, D-400 amide; and 172.2/172.4 ppm, 2-Me-PDA amide).

This example shows the preparation of a diamine product which contains two different kinds of amide moieties in its backbone. The different amide moieties result from the two different diamines used in its preparation.

Example 62

Preparation of a Diamine Containing About Twenty-Four Amide Moieties in its Backbone Based on Jeffamine ™ D-400 and 2-Methyl-1,5-pentanediamine; 0.83:1 Molar Ratio Jeffamine ™ D-400 (115.09 g, 0.250 mole), 2-methyl-1,5-pentanediamine (34.90 g, 0.300 mole) and adipic acid (73.09 g, 0.500 mole) are combined in the same reaction setup used in Example 60. The reactor is heated at 120° C. for 1 hour to form the corresponding salt. Toluene (50 ml) is added and the system is heated at reflux (175° C.) for 24 hours. Toluene is removed at reduced pressure (2 hr/150° C./1 mm Hg). The product is obtained as a viscous liquid: Brookfield viscosity = >2,000,000 cps at 22° C.; 0.4684 meq amine/g by titration with 0 1 N $HClO_4$; calculated average molecular weight is 4270 by end group titration. Carbon-13 NMR (DMSO-$d_6$) shows amide carbonyls (171.9 ppm, D-400 amide; and 172.3/172.5 ppm, 2-Me-PDA amide).

This example shows the preparation of a diamine product which contains two different kinds of amide moieties in its backbone. The different amide moieties result from the two different diamines used in its preparation.

Example 63

Preparation of a Diamine Containing About Two Thiourea Moieties in its Backbone Based on Jeffamine ™ D-400 and 2-Methyl-1,5-pentanediamine; 5:1 Molar Ratio Jeffamine ™ D-400 (230.04 g, 0.500 mole), 2-methyl-1,5-pentanediamine (11.62 g, 0.100 mole) and thiourea (38.07 g, 0.500 mole) are combined in the same reaction setup used in Example 50. The reactor is heated at 150° C. for 23 hours. The product is obtained as a viscous liquid: Brookfield viscosity = 76,100 cps at 22° C.; 1.414 meq amine/g and 2.3 thiourea moieties/-molecule by titration with 0.1 N $HClO_4$; calculated average molecular weight is 1414 by end group titration. Carbon-13 NMR (DMSO-$d_6$) shows thiourea carbonyls (181.7 ppm, D-400/D-400 thiourea; and a broad band from 182.0-183.0 ppm, D-400/2-Me-PDA thiourea and 2-Me-PDA/2-Me-PDA thiourea).

This example shows the preparation of a diamine product which contains three different kinds of thiourea moieties in its backbone. The different thiourea moieties result from the two different diamines used in its preparation.

The addition of urea, thiourea, biuret and/or amide moieties into the diamine backbone produces polymers which have superior green strength at demold (much less brittle than plaques without these moieties). They also have greatly increased modulus, toughness and strength properties (see Table I) in many cases. Solvent resistance and hardness are also greatly increased (see Table II). Impact properties are reduced in some cases, but post-curing restores many of these properties in Dynatup measurements (see Table III).

It is understood that various other modifications will be apparent also and can readily be made by those skilled in the art without departing from the scope of the invention. Accordingly, it is not intended that the scope of the claims appended hereto be limited to the description as set forth herein, but rather that the claims be construed as encompassing all the features of patentable novelty which reside in the present invention, including all the features which would be considered as equivalents thereof by those skilled in the art to which this invention pertains.

TABLE I

Tensile and Modulus Properties of Polymers Based on Backbone Modified Diamines and Blends with D-2000

| Plaque from Example | Post-Cured[1] | Flexural Modulus[2] | Youngs Modulus[3] | Yield Stress[3] | Yield Strain[3] | Ultimate Stress[3] | Ultimate Strain[3] |
|---|---|---|---|---|---|---|---|
| C* | no | 142,800 | 160,000 | 6240 | 11.1 | 6020 | 18.2 |
|  | yes | 153,750 | 170,000 | 6680 | 11.3 | 6510 | 16.8 |
| 17 | no | 214,750 | 280,000 | 8540 | 10.2 | 8280 | 8.3 |
|  | yes | 227,000 | 285,000 | 8540 | 10.5 | 8400 | 10.8 |
| 18 | no | 284,000 | 320,000 | — | — | 6350 | 2.4 |
|  | yes | 290,750 | 322,000 | 6750 | 2.8 | 10400 | 9.9 |
| 19 | no | 131,300 | 175,000 | 5970 | 12.6 | 5790 | 13.0 |
|  | yes | 140,800 | 185,000 | 6520 | 13.5 | 6500 | 13.8 |
| 20 | no | 120,000 | 125,000 | NO | NO | 4320 | 7.2 |
|  | yes | 126,000 | 130,000 | 5030 | 14.4 | 4980 | 13.1 |
| 22 | no | 160,750 | 175,000 | 6320 | 11.0 | 6110 | 13.8 |
|  | yes | 179,750 | 177,500 | 6730 | 10.7 | 6575 | 13.7 |
| 23 | no | 178,500 | 190,000 | 6820 | 10.9 | 6580 | 12.9 |
|  | yes | 180,700 | 195,000 | 6840 | 10.3 | 6630 | 13.6 |
| 24 | no | 198,250 | 220,000 | 7700 | 10.5 | 7300 | 14.5 |
|  | yes | 210,300 | 225,000 | 7780 | 10.0 | 7510 | 16.3 |
| 25 | no | 361,500 | ND | ND | ND | ND | ND |
|  | yes | 400,000 | ND | ND | ND | ND | ND |
| 28 | no | 285,000 | TB | TB | TB | TB | TB |
|  | yes | 286,000 | 280,000 | NO | NO | 2280 | 0.6 |
| 29 | no | 220,000 | ND | ND | ND | ND | ND |
| 30 | no | 230,000 | 230,000 | NO | NO | 3490 | 1.6 |
|  | yes | 240,000 | 242,000 | 2560 | 1.7 | 5870 | 15.5 |
| 32 | no | 245,750 | 270,000 | 7935 | 10.7 | 7780 | 13.3 |
|  | yes | 255,500 | 290,000 | 9430 | 9.9 | 9270 | 15.1 |
| 33 | no | 199,250 | 220,000 | 6680 | 10.5 | 6570 | 12.7 |
|  | yes | 259,000 | 250,000 | 8150 | 10.2 | 7910 | 12.9 |
| 34 | no | 179,000 | 195,000 | 6240 | 11.0 | 5890 | 12.6 |
|  | yes | 185,750 | 228,000 | 7690 | 10.7 | 7420 | 11.9 |
| 35 | no | 318,500 | 335,000 | 9310 | 9.4 | 8550 | 9.8 |
|  | yes | 334,250 | 380,000 | 9900 | 5.1 | 9680 | 7.3 |
| 36 | no | 211,300 | 260,000 | 8230 | 10.3 | 8070 | 13.1 |
|  | yes | 235,300 | 270,000 | 8640 | 10.5 | 8480 | 13.0 |
| CE 1** | no | 167,000 | 200,000 | 6940 | 10.7 | 6770 | 14.6 |
|  | yes | 199,000 | 220,000 | 7475 | 10.6 | 7210 | 16.6 |
| 37 | no | 300,000 | 300,000 | NO | NO | 6230 | 2.4 |
|  | yes | 350,000 | 355,000 | NO | NO | 10,800 | 8.0 |
| 38 | no | 220,000 | 200,000 | NO | NO | 6450 | 5.8 |
|  | yes | 220,000 | 240,000 | 7950 | 9.0 | 7740 | 9.3 |
| 39 | no | 172,000 | 170,000 | NO | NO | 5195 | 4.8 |
|  | yes | 185,000 | 190,000 | 3580 | 0.5 | 6315 | 6.5 |
| 40 | no | 136,000 | 150,000 | NO | NO | 4120 | 5.8 |
|  | yes | 148,000 | 160,000 | NO | NO | 4680 | 6.6 |
| 41 | no | 88,000 | 95,000 | NO | NO | 5620 | 6.0 |
|  | yes | 98,000 | 120,000 | NO | NO | 2500 | 3.6 |
| 42 | no | 87,000 | 100,000 | NO | NO | 7250 | 6.7 |
|  | yes | 94,000 | 120,000 | NO | NO | 3200 | 4.7 |
| 43 | no | 210,000 | 227,000 | NO | NO | 6440 | 3.9 |
|  | yes | 220,000 | 240,000 | 7440 | 8.4 | 7620 | 10.9 |
| 44 | no | 172,000 | 180,000 | NO | NO | 3440 | 2.0 |
|  | yes | 185,000 | 185,000 | NO | NO | 5860 | 5.5 |
| 45 | no | 136,000 | 150,000 | NO | NO | 3400 | 3.0 |
|  | yes | 148,000 | 160,000 | NO | NO | 4150 | 6.0 |
| 46 | no | 80,000 | 95,000 | NO | NO | 2950 | 7.8 |
|  | yes | 90,000 | 100,000 | NO | NO | 1566 | 5.3 |

[1] Post-cured at 175° C. for one hour
[2] ASTM D-790
[3] ASTM D-638
*Sample is not an example of the invention. Jeffamine D-2000 is substituted for the polyamine component in the formulation of Example 11
NO = not observed
ND = not determined
TB = too brittle
**Comparative Example 1 - not an example of this invention

TABLE II

Hardness and Solvent Resistance Properties of Polymers Based on Backbone-Modified Diamines and Blends with D-2000

| Plaque from Example | Post-Cured[1] | Hardness[2] (Shore D) | Solvent Resistance (% weight gain after 6 days)[3] | | | |
|---|---|---|---|---|---|---|
| | | | Water | Methanol | Toluene | MEK |
| C* | no | 75 | 1.4 | 22.8 | 10.2 | 24.2 |
| | yes | 76 | 1.2 | 21.2 | 11.9 | 31.4 |
| 17 | no | 76 | 1.2 | 16.2 | 2.9 | 11.1 |
| | yes | 77 | 1.2 | 13.5 | 1.8 | 8.3 |
| 18 | no | 85 | 0.3 | 12.2 | 0.3 | 2.3 |
| | yes | 85 | 0.3 | 11.4 | 0.3 | 1.9 |
| 19 | no | 73 | 1.5 | 26.2 | 11.7 | 41.0 |
| | yes | 75 | 1.6 | 25.6 | 9.6 | 33.7 |
| 20 | no | 58 | 2.1 | 32.5 | 30.7 | 45.6 |
| | yes | 58 | 2.2 | 30.8 | 28.6 | 42.3 |
| 22 | no | 75 | 1.6 | 22.6 | 11.3 | 23.5 |
| | yes | 79 | ND | ND | ND | ND |
| 23 | no | 77 | 1.4 | 22.1 | 7.7 | 19.6 |
| | yes | 78 | ND | ND | ND | ND |
| 24 | no | 77 | 1.2 | 20.2 | 4.1 | 18.3 |
| | yes | 78 | ND | ND | ND | ND |
| 25 | no | 82 | 0.8 | 13.0 | 0.4 | 6.0 |
| | yes | 84 | 0.8 | 11.4 | 0.2 | 2.5 |
| 28 | no | 63 | 1.0 | 17.1 | 0.4 | 14.3 |
| | yes | 67 | 0.9 | 11.8 | 0.3 | 5.0 |
| 29 | no | 62 | ND | ND | ND | ND |
| 30 | no | 64 | 1.4 | 18.5 | 3.4 | 16.9 |
| | yes | 60 | 1.3 | 15.4 | 1.7 | 10.6 |
| 32 | no | 78 | ND | ND | ND | ND |
| | yes | 80 | 1.4 | 16.3 | 1.1 | 6.5 |
| 33 | no | 75 | ND | ND | ND | ND |
| | yes | 77 | 1.4 | 16.7 | 3.9 | 11.6 |
| 34 | no | 73 | ND | ND | ND | ND |
| | yes | 75 | 1.7 | 20.2 | 6.7 | 20.0 |
| 35 | no | 82 | 0.9 | 14.0 | 0.6 | 6.0 |
| | yes | 82 | ND | ND | ND | ND |
| CE 1** | no | 59 | 2.2 | 19.3 | 9.2 | 27.2 |
| | yes | 61 | 1.7 | 19.6 | 7.2 | 18.6 |
| 37 | no | 64 | 2.0 | 23.3 | 0.5 | 3.8 |
| | yes | 66 | 1.7 | 18.8 | 0.3 | 2.1 |
| 38 | no | 61 | 2.7 | 25.5 | 13.1 | 24.0 |
| | yes | 62 | 2.6 | 23.4 | 10.2 | 19.7 |
| 39 | no | 58 | 3.1 | 29.3 | 24.0 | 33.1 |
| | yes | 59 | 3.0 | 28.4 | 20.4 | 30.4 |
| 40 | no | 58 | 3.6 | 40.8 | 34.3 | 51.1 |
| | yes | 58 | 3.6 | 36.3 | 25.9 | 43.2 |
| 41 | no | 51 | 3.1 | 43.0 | 40.1 | 54.6 |
| | yes | 51 | 2.9 | 41.7 | 37.2 | 54.1 |
| 42 | no | 53 | 2.8 | 41.6 | 33.8 | 54.4 |
| | yes | 55 | 2.5 | 40.0 | 35.8 | 52.7 |
| 43 | no | 61 | 2.1 | 26.5 | 16.5 | 27.8 |
| | yes | 60 | 2.0 | 26.5 | 14.2 | 22.9 |
| 44 | no | 61 | 3.3 | 31.1 | 25.7 | 36.9 |
| | yes | 59 | 3.4 | 30.9 | 22.1 | 34.5 |
| 45 | no | 58 | 3.1 | 36.4 | 32.4 | 46.4 |
| | yes | 58 | 2.5 | 34.3 | 30.7 | 42.4 |
| 46 | no | 46 | 3.9 | 63.0 | 61.8 | 67.3 |
| | yes | 47 | 2.5 | 47.3 | 49.7 | 63.7 |

[1] Post-cured at 175° C. for one hour
[2] ASTM E-140
[3] Percent weight gain when soaked in a given solvent for 6 days at ambient temperature
*Not an example of the invention for reason stated in Table I
ND = not determined
**Comparative Example 1 - not an example of this invention

TABLE IIII

Impact Properties of Polymers Based on Backbone-Modified Diamines and Blends with D-2000

| Plaque from Example | Post-Cured[1] | Notched Izod[2] | Dynatup Impact | | |
|---|---|---|---|---|---|
| | | | Max Force (lb) | Energy to Max Force | Energy to Break (ft lb) |
| C* | no | 3.1 | 600 | 4.8 | 5.3 |
| | yes | 3.7 | 554 | 4.4 | 5.7 |
| 17 | no | 2.4 | 361 | 2.0 | 3.2 |
| | yes | 1.9 | 624 | 4.5 | 6.4 |
| 18 | no | 0.4 | 174 | 0.2 | 0.4 |
| | yes | 0.4 | 298 | 0.6 | 0.9 |
| 19 | no | 2.0 | 358 | 2.1 | 4.9 |
| | yes | 2.0 | 400 | 2.2 | 5.4 |
| 20 | no | 2.0 | 120 | 0.4 | 0.6 |
| | yes | 2.5 | 400 | 4.3 | 5.2 |
| 22 | no | 2.3 | 264 | 1.3 | 1.6 |
| | yes | 2.5 | 464 | 3.2 | 5.7 |
| 23 | no | 2.2 | 296 | 1.4 | 1.6 |
| | yes | 2.0 | 521 | 3.8 | 7.0 |
| 24 | no | 1.5 | 262 | 0.8 | 1.0 |
| | yes | 1.9 | 505 | 3.5 | 6.3 |
| 25 | no | 0.3 | 229 | 0.3 | 0.6 |
| | yes | 0.4 | 425 | 0.8 | 1.1 |
| 28 | no | TB | 46 | 0.05 | 0.08 |
| | yes | 0.3 | 106 | 0.15 | 0.23 |
| 29 | no | ND | 44 | 0.06 | 0.09 |
| 30 | no | 0.5 | 68 | 0.13 | 0.18 |
| | yes | 0.5 | 100 | 0.25 | 0.34 |
| CE 1** | no | 2.2 | 435 | 3.4 | 4.4 |
| | yes | 2.2 | 594 | 4.9 | 5.9 |
| 32 | no | ND | 628 | 5.0 | 5.3 |
| | yes | 1.9 | 603 | 4.7 | 5.4 |
| 33 | no | ND | 450 | 2.8 | 3.1 |
| | yes | 1.9 | 435 | 3.0 | 4.6 |
| 34 | no | 2.6 | 261 | 1.4 | 1.6 |
| | yes | 2.4 | 702 | 6.4 | 6.9 |
| 35 | no | 0.4 | 351 | 0.6 | 0.9 |
| | yes | 0.4 | 585 | 1.5 | 2.0 |
| 36 | no | ND | ND | ND | ND |
| | yes | 1.7 | 625 | 3.2 | 3.8 |
| 37 | no | 0.3 | 85 | 0.2 | 0.2 |
| | yes | 0.5 | 163 | 0.5 | 0.5 |
| 38 | no | 1.5 | 125 | 1.4 | 1.7 |
| | yes | 1.7 | 450 | 4.3 | 5.1 |
| 39 | no | 2.2 | 137 | 0.7 | 0.9 |
| | yes | 2.2 | 440 | 5.0 | 5.6 |
| 40 | no | 2.3 | 90 | 0.5 | 0.7 |
| | yes | 3.1 | 190 | 1.3 | 1.5 |
| 41 | no | 2.0 | 132 | 1.0 | 1.2 |
| | yes | 1.8 | 176 | 1.4 | 1.6 |
| 42 | no | 2.4 | 146 | 0.9 | 1.0 |
| | yes | 2.2 | 120 | 0.7 | 0.9 |
| 43 | no | 2.1 | 120 | 1.4 | 2.0 |
| | yes | 2.5 | 325 | 2.2 | 3.4 |
| 44 | no | 1.8 | 70 | 0.1 | 0.2 |
| | yes | 2.8 | 795 | 8.5 | 9.2 |
| 45 | no | 1.8 | 90 | 0.4 | 0.5 |
| | yes | 2.4 | 405 | 3.5 | 3.8 |
| 46 | no | 1.9 | 247 | 2.6 | 2.9 |
| | yes | 1.8 | 225 | 2.1 | 2.5 |

[1] Post-cured at 175° C. for one hour
[2] ASTM D-256 (ambient temperature)
*Not an example of the invention for the reason stated in Table I
**Comparative Example 1 - not an exammple of this invention
TB = too brittle
ND = not determined

Example 64

Reaction Product of Diamine Containing Four Urea Moieties in its Backbone with ε-Caprolactone; ε-Caprolactone:Diamine; 4:1 Molar Ratio A diamine containing 4 urea moieties per average backbone molecule similar to that prepared in Example 1A(12) (192.5 g, 0.9767 mole, MW=2510) and ε-caprolactone (35.02 g, 0.307 mole) are combined in the same reaction setup used in Example 50. The reactor is heated at 180° C. for 6 hours. The product is obtained as a viscous liquid: Brookfield viscosity=142,800 cps at 22° C.; 0.0714 meq amine/g by titration with 0.1 N $HClO_4$; 89.4 percent amine conversion: calculated average molecular weight is 2966 by end group titration.

Carbon-13 NMR (DMSO-d$_6$) shows amide carbonyl moieties (171 8 ppm), ester carbonyl moieties (173.1 ppm) and urea carbonyl moieties (157.5 ppm).

This example shows the preparation of a product which contains internal urea moieties in its backbone. A small amount of amino end groups (approx. 10 percent) are still present. There has been a substantial amount of further reaction to hydroxyl end groups linked by ester moieties (approx. 52:48 ester:amide moieties). Hydroxyl end groups linked by ester moieties account for the majority of the product.

Example 65

Preparation of an Isocyanate Functional Prepolymer Comprised of Isonate TM 143LM and a 90/10 Weight Blend of Voranol TM 2120 and a Four Urea Diamine Capped with s-Caprolactone A silanized, 100-ml resin kettle with a four-necked top is equipped with a mechanical stirrer, thermometer, vacuum inlet and a pressure equalizing addition funnel capped with a rubber septum. The kettle is heated to 55° C. in an oil bath and then charged with 5.36 g (0.0036 equivalent) of the material made in Example 64 of disclosure D-35,787 and 39.97 g (0.2693 equivalent) of Isonate TM 143LM carbodiimide-modified diisocyanate (a version of Isonate TM 143L which has a high percentage of the para-para isomer). The stirrer is then started and the kettle is placed under a vacuum of 0.5 mm Hg. Voranol TM 2120 (a 2000 MW polypropylene glycol, sold by The Dow Chemical Company) (44.50 g, 0.0441 equivalent) is charged to the addition funnel through the septum via a syringe. The Voranol TM 2120 is then added dropwise to the kettle over a 45-minute period while the stirring and vacuum are maintained.

After a reaction time of approximately 4 hours, a standard HCl/di-n-butylamine titration (ASTM D-1638-78) is done to determine the prepolymer's equivalent weight. The prepolymer's equivalent weight is 416.72 g/equivalent with an NCO content of 10.08 weight percent.

Example 66

Preparation of a Polymer Based on 1,4-Butanediol and the Prepolymer Made in Example 65

The reaction setup and equipment are used that were used in Example 65. 1,4-Butanediol (9.33 g, 0.2071 equivalent) are added to the prepolymer through the septum via a syringe. The mixture is stirred under vacuum for 1.75 minutes and is then poured into a 4"×4"×0.125" steel window mold lined with mylar sheets. The mold is then closed and placed in a 150° C. oven for one hour after which it is removed and allowed to cool before being opened. The amount of 1,4-butanediol added is calculated to give a hard segment content of 50 weight percent. The Index (ratio of isocyanate groups to hydroxyl groups) is 1.03.

After being removed from the mold, the plaque is post-cured at 150° C. for one hour in a vacuum oven and cut apart for testing. Test results are given hereinbelow.

What is claimed is:

1. A modified polyamine comprising a backbone portion containing at least one polyalkyleneoxy moiety and one or more internal biuret, thiourea, dithiobiuret, or thioamide moieties, and a plurality of primary amino groups wherein each amino group is separated from each biuret, thiourea, dithiobiuret, or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units.

2. The modified polyamine of claim 1 which contains at least one internal biuret moiety.

3. The modified polyamine of claim 1 which contains at least one internal thiourea moiety.

4. The modified polyamine of claim 1 which contains at least one internal dithiobiuret moiety.

5. The modified polyamine of claim 1 which contains at least one internal thioamide moiety.

6. The modified polyamine of claim 1 represented by the formula:

$$NH_2-R-[X-R]_n-NH_2 \qquad I$$

wherein each R is independently in each occurrence an alkylene, cycloalkylene, aralkylene, aryl, alkyleneoxy, or polyalkyleneoxy moiety, wherein at least one R is polyalkyleneoxy; X is independently in each occurrence an acyclic moiety selected from the group consisting of urea, biuret, thiourea, dithiobiuret, amide, and thioamide; and n is an integer between 1 and 50.

7. A modified polyamine with a molecular weight of at least about 2000 comprising a backbone portion containing at least one polyalkyleneoxy moiety and two or more internal urea moieties, and a plurality of primary amino groups wherein each amino group is separated from each urea moiety by at least one alkylene, cycloalkylene, aralkylene, arylene, or alkyleneoxy moiety with 4–20 carbon atoms, or at least one polyalkyleneoxy moiety containing from 2–50 alkyleneoxy units.

8. A modified polyamine comprising a backbone portion containing at least one polyalkyleneoxy moiety and at least two aminocarbonyl moieties different from each other which two moieties are selected from the group consisting of urea, biuret, thiourea, dithiobiuret, thioamide and amide wherein each amino group is separated from each aminocarbonyl moiety by at least one alkylene, cycloalkylene, aralkylene, arylene, or alkyleneoxy moiety with 4–20 carbon atoms, or at least one polyalkyleneoxy moiety with 2–50 alkyleneoxy units.

9. A process for preparing a modified polyamine containing at least one internal biuret or dithiobiuret moiety which comprises contacting a polyalkyleneoxy polyamine with biuret or dithiobiuret under reaction conditions sufficient to form the corresponding modified polyamine containing at least one internal biuret or dithiobiuret moiety.

10. A process for preparing an active hydrogen-containing compound with hydroxyl end groups which comprises contacting the modified polyamine of claim 1 with a cyclic lactone under reaction conditions sufficient to form the corresponding modified active hydrogen-containing compound with at least one hydroxyl end group.

11. An active hydrogen-containing compound comprising a backbone portion containing at least one polyalkyleneoxy moiety and one or more internal urea, biuret, thiourea, dithiobiuret, amide or thioamide moieties, and a plurality of primary amino end groups and at least one hydroxyl end group, wherein each amino or hydroxyl end group is separated from each urea, biuret, thiourea, dithiobiuret, amide or thioamide moiety by at least one alkylene, cycloalkylene, aralkylene, arylene, or alkyleneoxy moiety with 4–20 carbon atoms, or at least one polyalkyleneoxy moiety containing from 2–50 alkyleneoxy units.

* * * * *

UNITED STATES PATENT AND TRADEMARK OFFICE
CERTIFICATE OF CORRECTION

PATENT NO. : 5,055,544

DATED : October 8, 1991

INVENTOR(S) : Robert F. Harris et al

It is certified that error appears in the above-identified patent and that said Letters Patent is hereby corrected as shown below:

On the title page, item [54] and col. 1, line 1, the first line of the title reads "AMINO-FUNCTIONAL POLYESTERS" it should read --AMINO-FUNCTIONAL POLYETHERS--.

Signed and Sealed this

Twenty-third Day of March, 1993

Attest:

STEPHEN G. KUNIN

*Attesting Officer*      Acting Commissioner of Patents and Trademarks